United States Patent
Murphy et al.

(10) Patent No.: US 10,760,828 B2
(45) Date of Patent: Sep. 1, 2020

(54) CHILLER PLANT WITH ICE STORAGE

(71) Applicant: TRANE INTERNATIONAL INC., Davidson, NC (US)

(72) Inventors: John Arthur Murphy, Onalaska, WI (US); Susanna S. Hanson, La Crosse, WI (US); Kevin P. Bradley, Germantown, MD (US); Anthony Wayne Bruno, Blaine, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 128 days.

(21) Appl. No.: 15/880,821

(22) Filed: Jan. 26, 2018

(65) Prior Publication Data
US 2018/0209700 A1 Jul. 26, 2018

Related U.S. Application Data

(60) Provisional application No. 62/450,965, filed on Jan. 26, 2017.

(51) Int. Cl.
*F25B 25/00* (2006.01)
*F24F 11/65* (2018.01)
(Continued)

(52) U.S. Cl.
CPC ............ *F25B 25/00* (2013.01); *F24F 5/0017* (2013.01); *F24F 11/30* (2018.01); *F24F 11/65* (2018.01);
(Continued)

(58) Field of Classification Search
CPC .. F28D 20/0039; F25B 25/005; F25B 29/003; F25B 30/02; F25B 49/022;
(Continued)

(56) References Cited

U.S. PATENT DOCUMENTS 5,323,618 A * 6/1994 Yoshida ................ F24F 5/0017
62/149
7,954,336 B2 * 6/2011 Jacobi ................... F24F 5/0017
62/434
(Continued)

FOREIGN PATENT DOCUMENTS

CN 201177332 Y 1/2009
CN 203375594 U * 1/2014
(Continued)

OTHER PUBLICATIONS

Extended European Search Report; European Patent Application No. 18153581.6, dated May 24, 2018 (9 pages).

*Primary Examiner* — Frantz F Jules
*Assistant Examiner* — Lionel Nouketcha
(74) *Attorney, Agent, or Firm* — Hamre, Schumann, Mueller & Larson, P.C.

(57) ABSTRACT

A chiller plant is disclosed. The chiller plant includes a chiller circuit including a chiller, a first process fluid circuit, and a first heat exchanger. The chiller is configured to provide a first process fluid at a first temperature. The chiller plant also includes an air handling circuit including a plurality of ice storage tanks and an air handling unit. The chiller plant further includes a terminal cooling circuit including a plurality of terminals, the terminal cooling circuit providing a second process fluid to the plurality of terminals at a second temperature that is different from the first temperature. The terminal cooling circuit is fluidly separate from, but thermally communicates with, the chiller circuit via the first heat exchanger.

14 Claims, 18 Drawing Sheets

(51) Int. Cl.
   *F24F 11/30* (2018.01)
   *F24F 5/00* (2006.01)
   *F24F 3/14* (2006.01)
   *F24D 3/18* (2006.01)
   *F25B 29/00* (2006.01)

(52) U.S. Cl.
   CPC .............. *F24D 3/18* (2013.01); *F24F 3/1405* (2013.01); *F24F 5/0021* (2013.01); *F25B 25/005* (2013.01); *F25B 29/003* (2013.01); *Y02E 60/147* (2013.01)

(58) Field of Classification Search
   CPC ...... F25B 2339/047; F25B 9/008; F24D 3/18; F24D 17/02
   See application file for complete search history.

(56) References Cited

U.S. PATENT DOCUMENTS

| | | | |
|---|---|---|---|
| 9,271,429 B2 * | 2/2016 | Mashiko | H05K 7/2079 |
| 2009/0288430 A1 * | 11/2009 | Anderson | F25B 13/00 62/79 |
| 2009/0293507 A1 * | 12/2009 | Narayanamurthy | F24F 5/0017 62/59 |
| 2011/0083462 A1 * | 4/2011 | Engelhart | F24D 3/08 62/324.1 |
| 2014/0230477 A1 * | 8/2014 | Furui | F25B 5/04 62/238.6 |
| 2014/0260376 A1 * | 9/2014 | Kopko | F25D 3/005 62/99 |
| 2016/0076821 A1 * | 3/2016 | Kopko | F25B 7/00 165/10 |

FOREIGN PATENT DOCUMENTS

| | | |
|---|---|---|
| CN | 203375594 U | 1/2014 |
| JP | H01-121641 A | 5/1989 |
| JP | H07-301433 A | 11/1995 |
| JP | H11-294832 A | 10/1999 |
| JP | 2000-05417 A | 2/2000 |

* cited by examiner

US 10,760,828 B2

CHILLER PLANT WITH ICE STORAGE

FIELD

This disclosure relates generally to a chiller plant in a heating, ventilation, air conditioning, and refrigeration (HVACR) system. More specifically, this disclosure relates to systems and methods for a dual temperature chiller plant in an HVACR system.

BACKGROUND

A chiller can generally be used in a heating, ventilation, air conditioning, and refrigeration (HVACR) system to remove heat from a process fluid (e.g., water or the like) via a refrigeration cycle (e.g., a vapor compression cycle). The chiller can be configured to cool the process fluid to a specific temperature set point(s) based on, for example, a primary function of the process fluid. In some situations, for example, the process fluid may be used to provide sensible cooling to a building or an enclosed space, for which the temperature of the process fluid may be in a range of, for example, at or about 57° F. to at or about 60° F. In some situations, for example, a chiller may be configured to provide a relatively cold process fluid (e.g., in a range of at or about 40° F. to at or about 45° F.) to an air-handling unit for dehumidification.

SUMMARY

This disclosure relates generally to a chiller plant in a heating, ventilation, air conditioning, and refrigeration (HVACR) system. More specifically, this disclosure relates to systems and methods for a dual temperature chiller plant in an HVACR system.

A chiller plant is disclosed. The chiller plant includes a chiller circuit including a chiller and a process fluid circuit. The chiller is configured to provide a process fluid at a first temperature. The chiller plant also includes an air handling circuit including a plurality of ice storage tanks and an air handling unit.

A chiller plant is disclosed. The chiller plant includes a chiller circuit including a chiller, a first process fluid circuit, and a first heat exchanger. The chiller is configured to provide a first process fluid at a first temperature. The chiller plant also includes an air handling circuit including a plurality of ice storage tanks and an air handling unit. The chiller plant further includes a terminal cooling circuit including a plurality of terminals, the terminal cooling circuit providing a second process fluid to the plurality of terminals at a second temperature that is different from the first temperature. The terminal cooling circuit is fluidly separate from, but thermally communicates with, the chiller circuit via the first heat exchanger.

A method of operating a chiller plant is also disclosed. The method includes receiving, by a controller, a plurality of operating factor inputs from one or more sensors in a chiller plant. The controller determines an operating mode and a setpoint based on the plurality of operating factors. The method further includes sending, by the controller, operating states to one or more components of the chiller plant to place the chiller plant in the operating mode and at the setpoint as determined.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

A chiller can generally be used in an HVACR system to remove heat from a process fluid (e.g., water or the like) via a refrigeration cycle (e.g., a vapor compression cycle). The chiller can be configured to cool the process fluid to a specific temperature set point(s) based on, for example, a primary function of the process fluid. To provide the process fluid at multiple temperatures, some HVACR systems include a plurality of chillers. In other HVACR systems, a chiller may be used to provide sensible cooling and a separate system may be used for dehumidification.

A chiller generally includes a refrigerant circuit (see FIG. 6 and its corresponding description below). In an embodiment, a single chiller includes a refrigerant circuit. In an embodiment, a plurality of chillers can be connected in parallel. In an embodiment, the chiller can include a water side economizer.

This disclosure is directed to a dual temperature chiller plant that uses a chiller to provide a process fluid (e.g., water or the like) at multiple temperatures (or temperature ranges) to provide the process fluid for purposes of sensible cooling and/or dehumidification. In an embodiment, the dual temperature chiller plant (hereinafter "chiller plant") includes ice storage tanks. The ice storage tanks can, for example, store ice that can be frozen for later use. In an embodiment, the ice may be frozen during unoccupied hours (e.g., nighttime, etc.). During occupied hours the ice from the ice storage tanks can be melted to produce the relatively colder process fluid used to accomplish dehumidification. In an embodiment, the chiller plant including ice storage tanks can, for example, be more efficient than alternative options which might rely upon operating in a condition in which the relatively colder process fluid is used and is blended with a relatively warmer process fluid or an intermediate heat exchanger. In an embodiment, a chiller may be about 1 to about 2 percent more efficient per degree of temperature elevation of the process fluid. For example, if the process fluid is 15 to 20 degrees Fahrenheit warmer, the energy consumed can be reduced by 15 to 40 percent.

It will be appreciated that the classification of the building as being occupied or unoccupied is not intended to be limited. Accordingly, a building may include some occupants during unoccupied hours or may not include occupants during occupied hours. Further, these periods are intended to be examples. It will be appreciated that the various principles described in this specification can be applied during occupied or unoccupied hours. Furthermore, the occupied and unoccupied times are not intended to be limited to daytime or nighttime. Accordingly, the discussion of occupied, unoccupied, daytime, or nighttime classifications that follows is intended as an example, but can vary according to the principles described in this specification.

Figure 1:
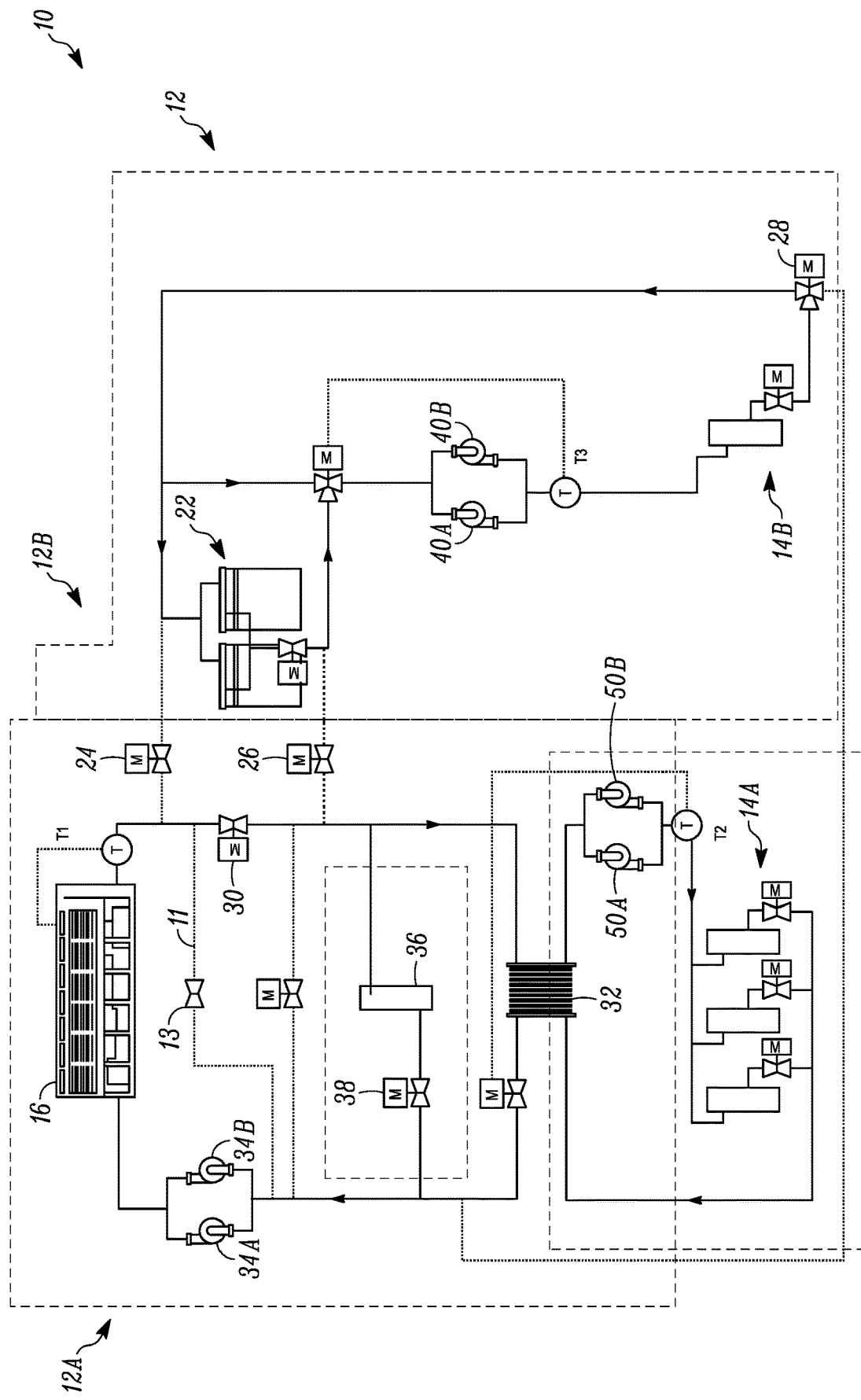
FIG. 1 is a schematic diagram of an HVACR system that includes a chiller plant and other components of the HVACR system, according to an embodiment.

FIG. 1 is a schematic diagram of an HVACR system 10 that includes a chiller plant 12 and other components of the HVACR system 10, according to an embodiment. The other components of the HVACR system 10 can include, for example, various terminal devices/systems including, but not limited to, a sensible cooling terminal 14A and/or an air handling unit (AHU) 14B.

In the illustrated embodiment, three terminals 14A are shown. It will be appreciated that the number of terminals 14A is illustrative and can vary based on, for example, a building in which the HVACR system 10 is implemented. The terminals 14A can include radiant cooling (e.g., panels or tubing which can be embedded into a building structure); chilled beams (e.g., active or passive); fan-powered terminals (e.g., fan-coils, fan-powered VAV terminals with sensible cooling coils, etc.); as well as suitable combinations thereof.

The chiller plant 12 includes a chiller 16. In the illustrated embodiment, a single chiller 16 is shown. It will be appreciated that one or more additional chillers may be included in parallel with the chiller 16. Such an embodiment may be used, for example, to provide additional capacity for a larger building. The chiller 16 can be configured to provide a process fluid (e.g., water, glycol, and/or a mixture of water and glycol, and the like) at a temperature T1. The temperature T1 can vary according to an operating mode of the chiller 16. An operating mode can include a configuration selected to control the chiller 16 and its outputs, for example, to accomplish a particular environmental control goal (e.g., sensible cooling or dehumidification) or to make ice for the ice storage tanks 22. For example, the operating mode can be selected to provide sensible cooling and/or dehumidification to the building. FIGS. 2A-2F, described in further detail below, show configurations of the HVACR system 10 according to various operating modes.

The HVACR system 10 includes the chiller plant 12 and a terminal cooling circuit 18. The chiller plant 12 includes a chiller circuit 12A and an air handling circuit 12B. In an embodiment, the air handling circuit 12B can be alternatively referred to as the outdoor air handling circuit 12B, or the like. The chiller circuit 12A includes a process fluid circuit that generally includes a system or fluid circuit that may include, as appropriate, pipes, lines, pumps, valves, and the like, that are configured to direct a process fluid conditioned by the chiller 16. The air handling circuit 12B includes a process fluid circuit that generally includes a system or fluid circuit that may include, as appropriate, pipes, lines, pumps, valves, etc., that are configured to direct a process fluid to the AHU 14B. The terminal cooling circuit 18 includes a process fluid circuit that generally includes a system or fluid circuit including pipes, lines, pumps, valves, etc., that are configured to direct a process fluid to the terminals 14A.

In an embodiment, the chiller circuit 12A includes the chiller 16, a flow control device 30, a heat exchanger 32, and a plurality of pumps 34A, 34B fluidly connected. The pumps 34A, 34B can be used to circulate the process fluid throughout the chiller circuit 12A. The chiller 16 is not intended to be limited to a particular chiller design. For example, the chiller 16 can be an air-cooled chiller, a water-cooled chiller, or the like. The chiller 16 includes a refrigerant circuit (not shown) configured to output the process fluid (e.g., water and/or glycol) at the temperature T1. In the illustrated embodiment, the temperature T1 may be at or about 55° F. As illustrated in FIG. 1, the chiller circuit 12A can further include a heat exchanger 36 and a flow control device 38. The heat exchanger 36 and flow control device 38 are illustrated within dashed lines because the heat exchanger 36 is optional. The heat exchanger 36 can be used for cooling (and in an embodiment, dehumidification as well) and can be the same as or similar to a heat exchanger of the AHU 14B. In an embodiment, including the heat exchanger 36 can reduce a cooling load on the heat exchanger of the AHU 14B. Reducing the cooling load on the heat exchanger of AHU 14B can, in an embodiment, reduce a size and/or number of the ice storage tanks 22 included in the HVACR system 10. In an embodiment, including the heat exchanger 36 can provide an increase in efficiency of the HVACR system 10 over an HVACR system 10 that does not include the heat exchanger 36. In an embodiment, the chiller circuit 12A can include a chiller minimum flow bypass 11 capable of fluidly connecting upstream of the flow control device 30 and upstream of the pumps 34A, 34B. A flow control device 13 can be used to enable or disable the chiller minimum flow bypass 11.

The chiller circuit 12A and the air handling circuit 12B are fluidly connectable. In the illustrated embodiment, the chiller circuit 12A and the air handling circuit 12B are fluidly separated by, for example, preventing flow of the process fluid between the circuits 12A, 12B. The flow can be controlled using flow control devices 24, 26, and 28. The flow control devices 24, 26, and 28 can be, for example, valves. In an embodiment, the flow control devices 24 and 26 can be two-way valves having a flow enabled state and a flow disabled state. The flow control device 28 can be a three-way flow control device that includes a flow enabled state and a flow disabled state for the three connections. In the illustrated embodiment, the flow control devices 24 and 26 are in the flow disabled state. The flow control device 28 is in a flow enabled state within the air handling circuit 12B. The flow control device 28 is in a flow disabled state for a connection between the air handling circuit 12B and a location that is downstream of the heat exchanger 32 in the chiller circuit 12A. In these states, the chiller circuit 12A and the air handling circuit 12B are fluidly separated.

In the illustrated embodiment, the chiller circuit 12A can be fluidly separated from the terminal cooling circuit 18. The chiller circuit 12A is in thermal communication with the terminals 14A via the heat exchanger 32. This arrangement can be selected so that the process fluid provided to the terminals 14A is a different process fluid than the process fluid used by the chiller 16. For example, the chiller 16 can use a process fluid that includes a mixture of water and glycol, whereas the terminals 14A can be provided with a process fluid that includes water without glycol. It will be appreciated that the terminals 14A and the chiller 16 can use the same process fluid. In an embodiment, when the terminals 14A and the chiller 16 use the same process fluid, the heat exchanger 32 may be removed from the HVACR system 10. Such an embodiment is shown and described in accordance with FIGS. 3-4F. In operation, the terminal cooling circuit 18 can provide a process fluid at a temperature T2. In an embodiment, the temperature T2 can be at or about 57° F. In an embodiment, the temperature T2 can be from at or about 57° F. to at or about 60° F.

The air handling circuit 12B includes ice storage tanks 22 fluidly connected with the AHU 14B and a plurality of pumps 40A, 40B. In the illustrated embodiment, two ice storage tanks 22 are shown. It will be appreciated that the number of ice storage tanks 22 can vary. That is, in an embodiment, there can be a single ice storage tank 22. In an embodiment, there can be more than two ice storage tanks 22. For example, the number of ice storage tanks 22 can be based on cooling requirements of the building for which the system 10 is being used. In an embodiment, the ice storage tanks 22 can be rated based on a number of ton-hours of stored cooling energy and a particular configuration selected based on the number of ton-hours of stored cooling energy relative to the cooling demands of the HVACR system 10. The air handling circuit 12B generally includes a same process fluid as the process fluid used by the chiller 16. That is, if the chiller 16 includes a process fluid that is a combination of water and glycol, then the air handling circuit 12B includes a process fluid that is a combination of water and glycol.

In the illustrated embodiment, the chiller 16 can generally provide the process fluid at the temperature T1. The process fluid is in a heat exchange relationship with the terminals 14A via the heat exchanger 32 and can exchange heat from the process fluid in the chiller circuit 12A to the process fluid in the terminal cooling circuit 18, thereby providing the process fluid to the terminals 14A at the temperature T2. The air handling circuit 12B can use melting of the ice in the ice storage tanks 22 to provide the process fluid at a temperature T3 to the AHU 14B. In an embodiment, the temperature T3 can be at or about 40° F. In an embodiment, the temperature T3 can be from at or about 40° F. to at or about 45° F. The operating mode shown in FIG. 1 may be representative of an operating mode in which the building of the HVACR system 10 is occupied. In an embodiment, the occupied operating condition may be generally referred to as a daytime operating mode.

FIGS. 2A-2F are schematic diagrams showing configurations for the HVACR system 10 shown in FIG. 1 in various operating modes.

Figure 2A:
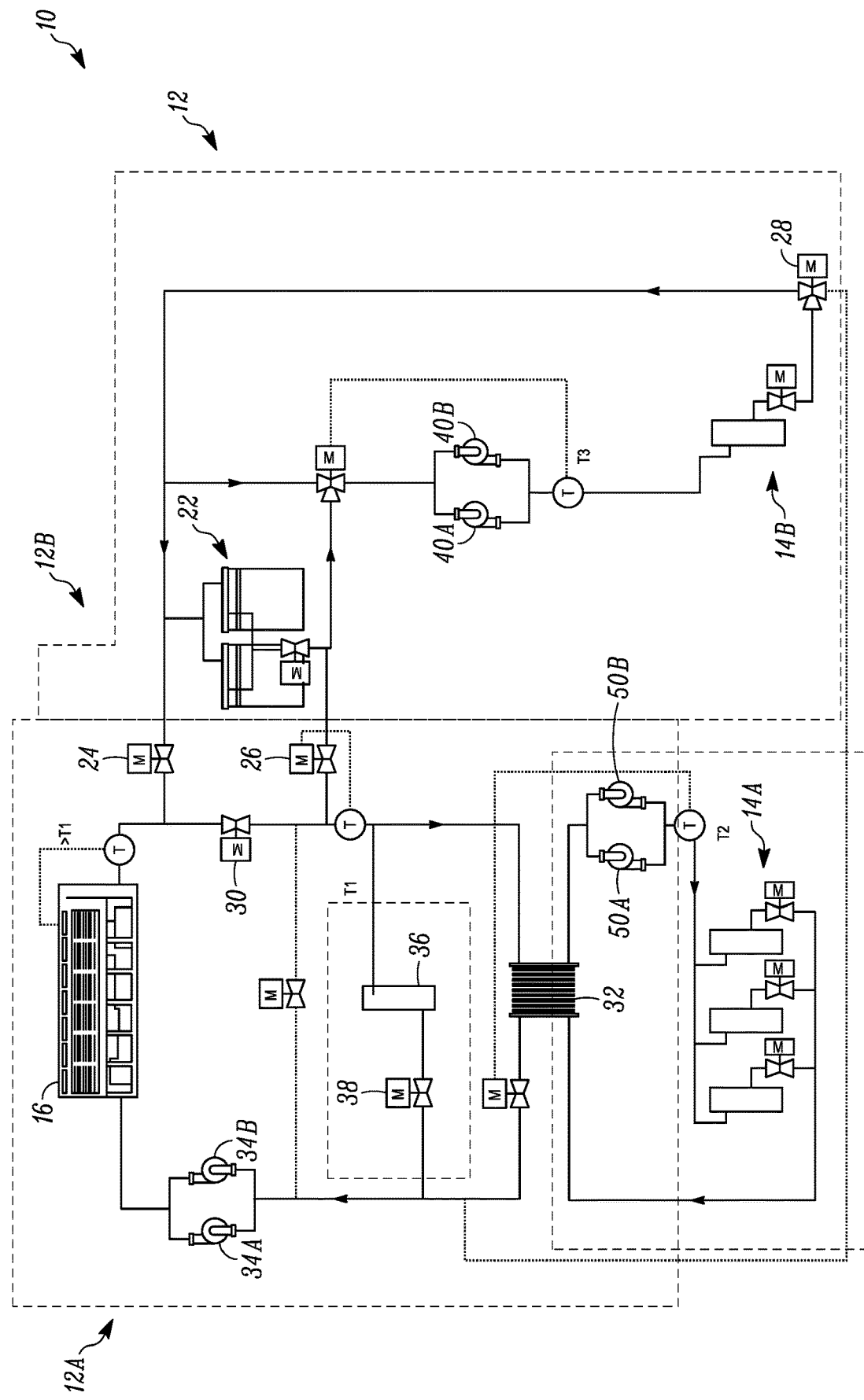
FIGS. 2A-2F are schematic diagrams showing configurations for the HVACR system shown in FIG. 1 in various operating modes.

FIG. 2A represents an operating condition in which the ice from the ice storage tanks 22 may be used to provide sensible cooling via the terminals 14A and dehumidification via the AHU 14B, according to an embodiment. The operating mode shown in FIG. 2A may be an alternative daytime operating mode relative to FIG. 1. The operating mode in FIG. 2A may be generally operational when the building of the HVACR system 10 is occupied.

In the illustrated embodiment, the process fluid provided from the chiller 16 may be provided at a temperature that is greater than the temperature T1. In an embodiment, operating the chiller 16 to provide the relatively warmer process fluid may, for example, reduce an amount of energy consumed by the chiller 16. In the illustrated embodiment, the flow control devices 24 and 26 are in the flow enabled state. Accordingly, the chiller circuit 12A and the air handling circuit 12B are fluidly connected. Because of the fluid connection, ice that is melting from the ice storage tanks 22 and is at a temperature lower than T1 can be mixed with the process fluid from the chiller 16. As a result, the process fluid can leave the chiller 16 at a temperature that is greater than T1, but be cooled to the temperature T1 at a location that is upstream of the heat exchanger 32. As a result, the process fluid provided to the terminals 14A can be provided at the temperature T2, even when the chiller 16 is outputting the process fluid at a temperature that is greater than the temperature T1. The melting ice from the ice storage tanks 22 can be used to provide a process fluid at the temperature T3. The process fluid at the temperature T3 can be provided to the AHU 14B for dehumidification.

Figure 2B:
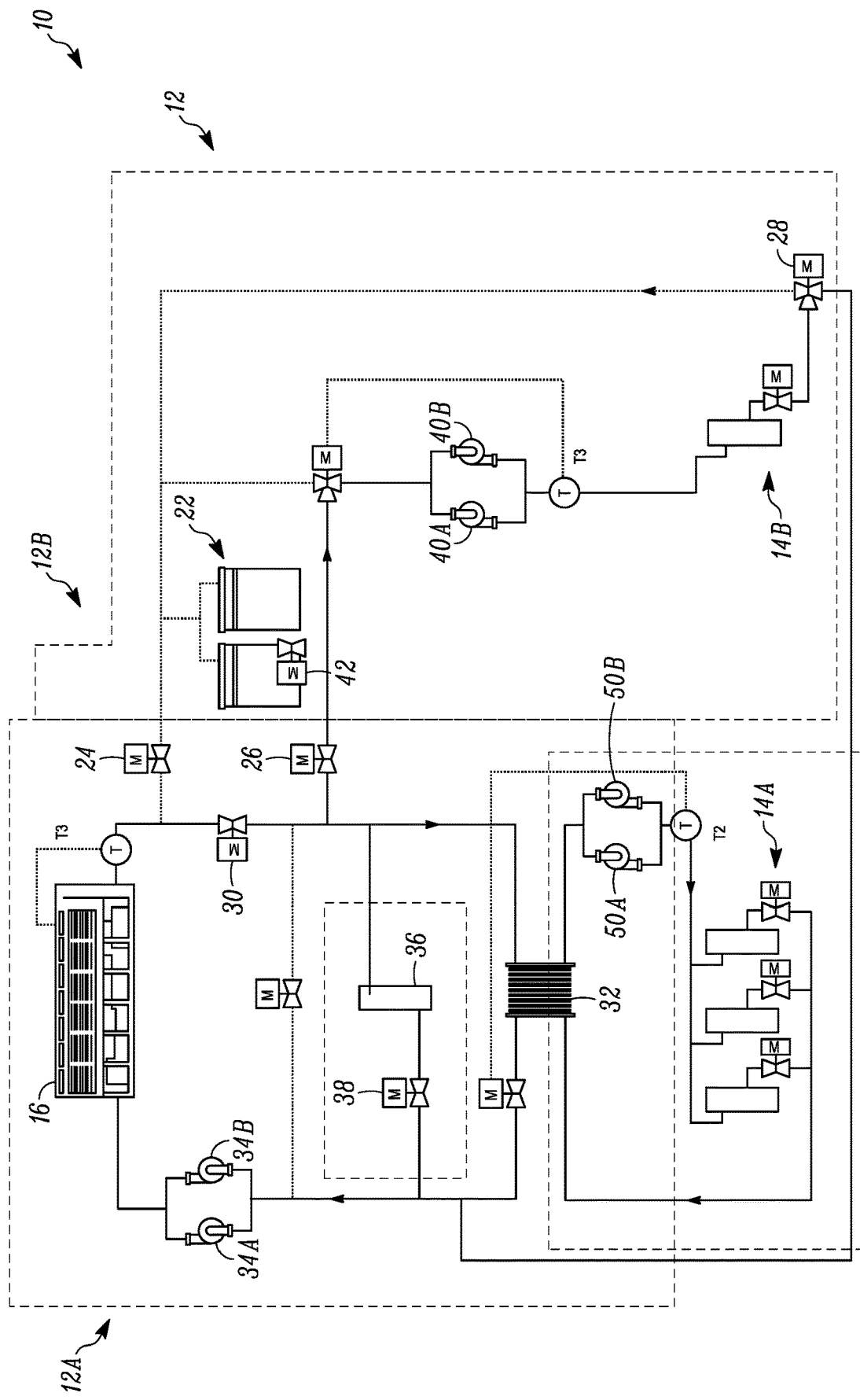

FIG. 2B represents an operating condition in which the chiller 16 can be used for both sensible cooling via the terminals 14A and dehumidification via the AHU 14B, according to an embodiment. The operating mode shown in FIG. 2B may be an alternative daytime operating mode relative to FIGS. 1 and 2A. The operating mode in FIG. 2B may be generally operational when the building of the HVACR system 10 is occupied.

In the illustrated embodiment, the process fluid provided from the chiller 16 may be provided at the temperature T3. In the illustrated embodiment, the flow control device 24 can be in the flow disabled state. The flow control device 26 can be in the flow enabled state. The flow control device 28 can be in a state in which flow is disabled between the chiller 16 and the flow control device 28. The flow control device 28 can be in a state where flow is enabled between the AHU 14B and the flow control device 28 The flow control device 28 is also in the flow enabled state between the flow control device 28 and a location of the chiller circuit 12A that is downstream of the heat exchanger 32. The state of the flow control devices 24, 26, and 28, enables fluid communication between the chiller circuit 12A and the air handling circuit 12B. However, the ice storage tanks 22 are fluidly separated from the air handling circuit 12B by placing a flow control device 42 in a flow disabled state. In such an embodiment, the ice storage tanks 22 may, for example, be empty or have an insufficient amount of ice to provide the process fluid at the temperature T3. The chiller 16 can provide the process fluid at the temperature T3. In the illustrated embodiment, the process fluid can be provided to the AHU 14B at the temperature T3. The diverted state of the flow control device 28 returns the process fluid to a location that is downstream of the heat exchanger 32. The heat exchange via the heat exchanger 32 can be used to exchange heat between the process fluid in the chiller circuit 12A and the process fluid in the terminal cooling circuit 18 so that the process fluid provided to the terminals 14A is at the temperature T2.

Figure 2C:
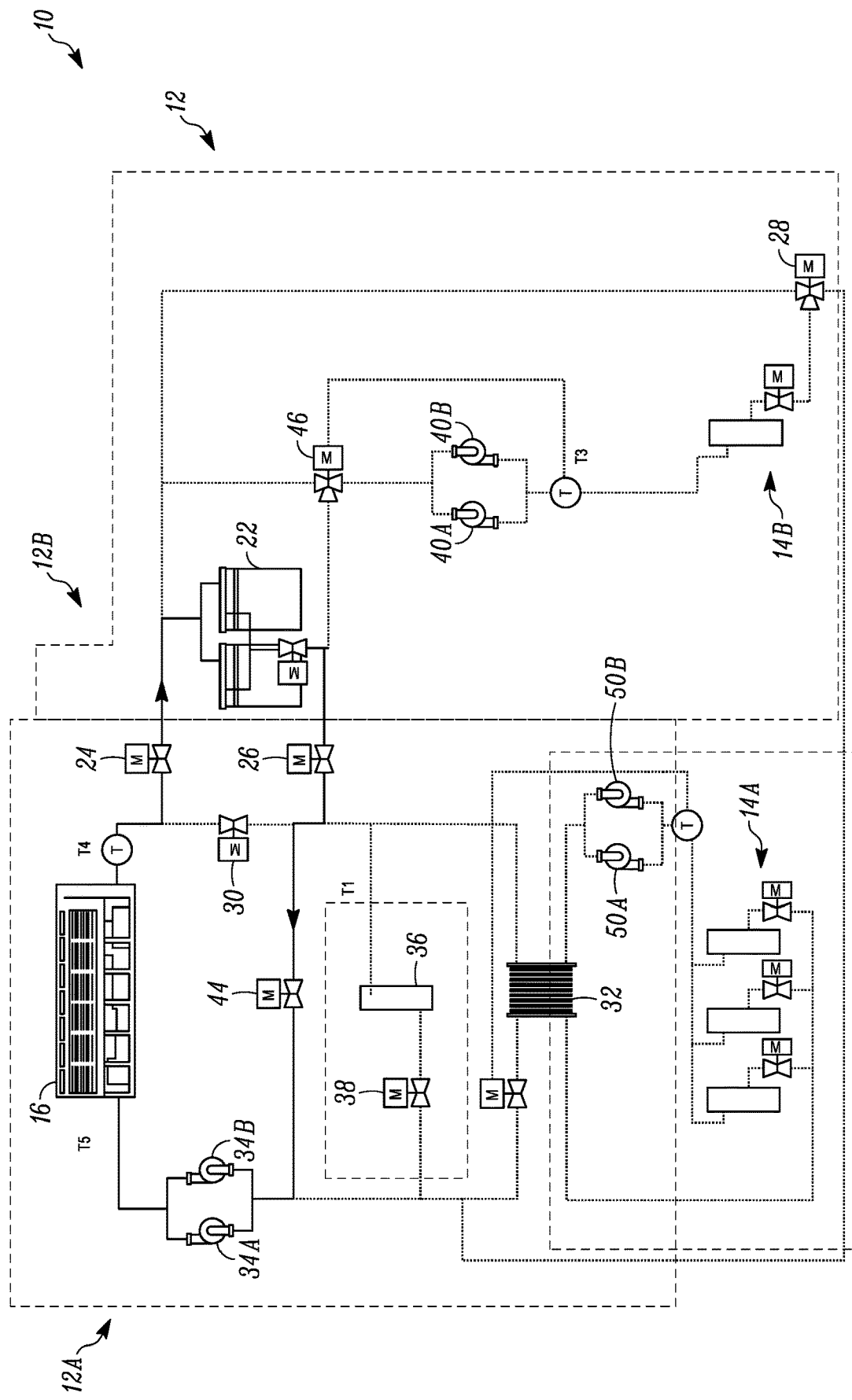

FIG. 2C represents an operating condition in which the chiller 16 can be used to make ice for the ice storage tanks 22, according to an embodiment. The operating mode shown in FIG. 2C may be an operating mode that is enabled, for example, when the building of the HVACR system 10 is unoccupied. Accordingly, the operating mode in FIG. 2C may alternatively be referred to as the nighttime operating mode in an embodiment.

In the illustrated embodiment, the process fluid can be provided from the chiller 16 at a temperature T4. In an embodiment, the temperature T4 can be from at or about 21° F. to at or about 25° F. The chiller 16 may be fluidly connected with the ice storage tanks 22 to freeze ice for later use. In the illustrated embodiment, the flow control device 24 and the flow control device 26 may be in the flow enabled state. A flow control device 30 may be in a flow disabled state to prevent the process fluid from bypassing the ice storage tanks 22 or from being provided to the heat exchanger 32. A flow control device 44 may be in the flow enabled state to enable the process fluid to return to the chiller 16. A flow control device 46 can be in a flow disabled state so that the process fluid is not provided to the AHU 14B. In an embodiment, the process fluid returned to the chiller 16 can be at a temperature T5. The temperature T5 can be from at or about 27° F. to at or about 31° F. It will be appreciated that the range is intended to be exemplary and that the actual temperatures may vary beyond the stated range. In an embodiment, the pumps 50A, 50B may be disabled in the operating mode of FIG. 2C.

Figure 2D:
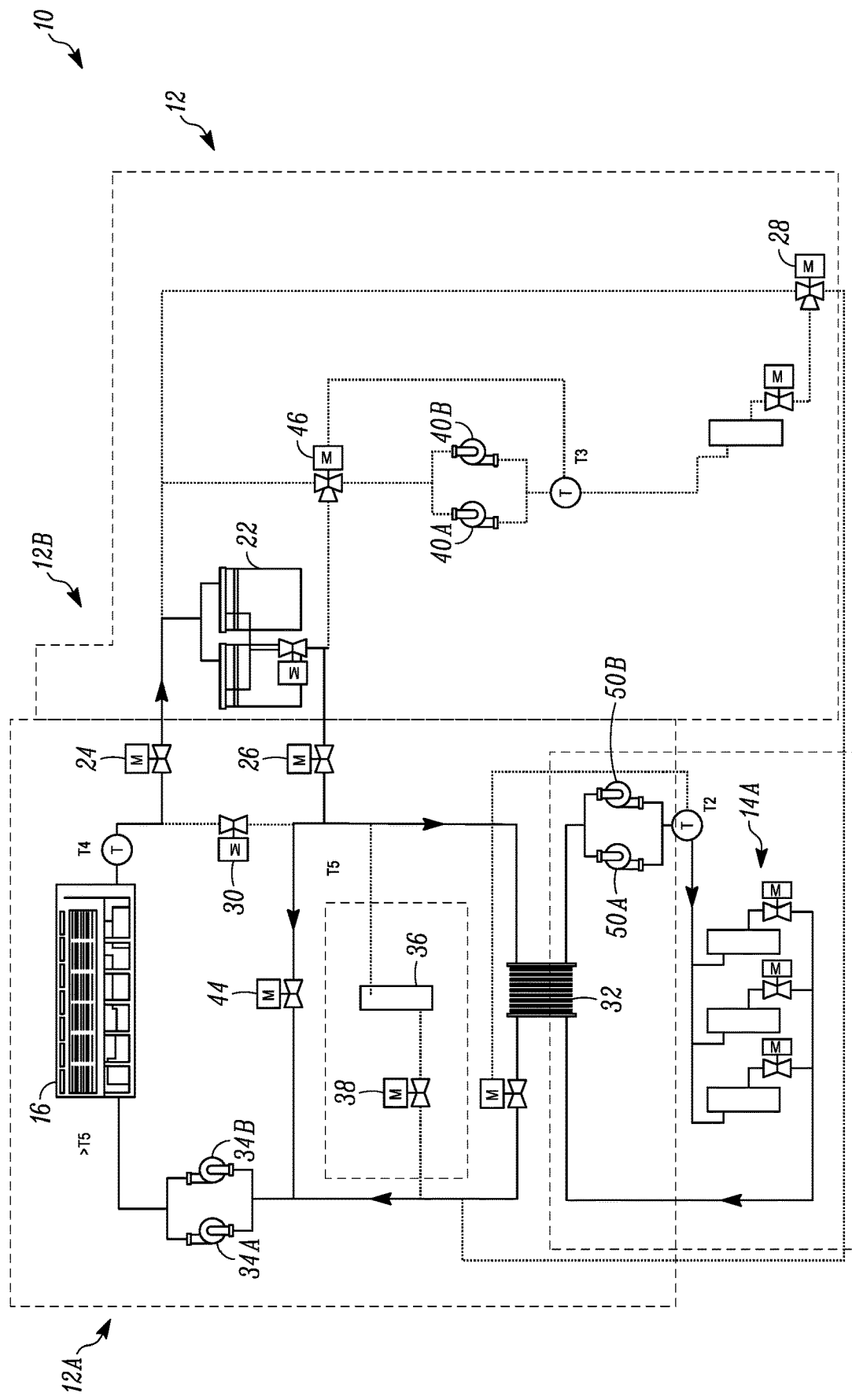

FIG. 2D represents an operating condition in which the chiller 16 can be used to make ice for the ice storage tanks 22 and to provide sensible cooling via the terminals 14A, according to an embodiment. The operating mode shown in FIG. 2D may generally be an operating mode in which ice can be made for later use (similar to FIG. 2C), as well as cooling provided to the terminals 14A. Such an operating mode may be used when, for example, the building is unoccupied but there is a cooling demand. The operating mode in FIG. 2D can be referred to as a nighttime operating mode.

The illustrated embodiment is similar to the embodiment shown and described relative to FIG. 2C. In FIG. 2D, the process fluid flow is enabled to the heat exchanger 32 such that the heat exchange can occur between the process fluid in the chiller circuit 12A and the process fluid in the terminal cooling circuit 18. As a result, the process fluid provided to the terminals 14A can be at the temperature T2. In FIG. 2D, the process fluid can be provided from the chiller 16 at the temperature T4. The process fluid leaving the ice storage tanks 22 and being provided to the heat exchanger 32 can be at the temperature T5. The process fluid in the chiller circuit 12A can exchange heat with the process fluid in the terminal cooling circuit 18 via the heat exchanger 32 such that the process fluid in the terminal cooling circuit 18 is at the temperature T2. The process fluid can be returned to the chiller 16 at a temperature that is greater than the temperature T5 as a result of the heat exchange at the heat exchanger 32.

Figure 2E:
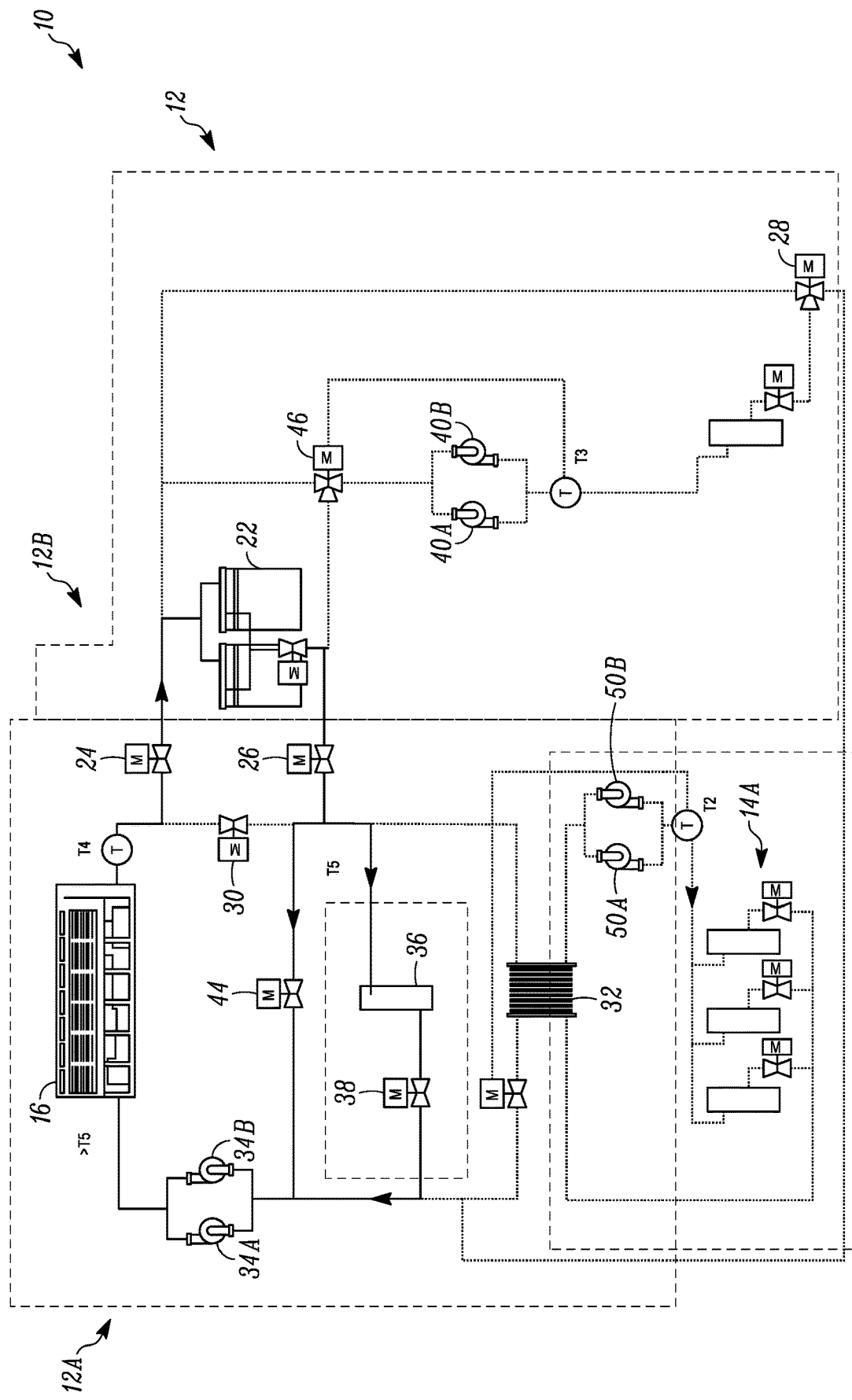

FIG. 2E represents an operating condition in which the chiller 16 can be used to make ice for the ice storage tanks 22 and for dehumidification using the heat exchanger 36, according to an embodiment. The operating mode shown in FIG. 2E may generally be an operating mode in which ice can be made for later use, as well as dehumidification provided via the optional heat exchanger 36. Thus, for the embodiment 2E to be practiced, the chiller circuit 12A should include the heat exchanger 36. Such an operating mode may be used when, for example, the building of the HVACR system 10 is unoccupied but there is a need to reduce humidity. The operating mode in FIG. 2E can also be referred to as a nighttime operating mode.

The illustrated embodiment is similar to the embodiment shown and described relative to FIG. 2C. In FIG. 2E, the process fluid flow can be enabled to the heat exchanger 36. The pumps 50A, 50B may be disabled in the illustrated embodiment. The process fluid leaving the ice storage tanks 22 can be at the temperature T5. The process fluid can then be provided to the heat exchanger 36, and can be returned to the chiller 16 at a temperature that is greater than the temperature T5.

Figure 2F:
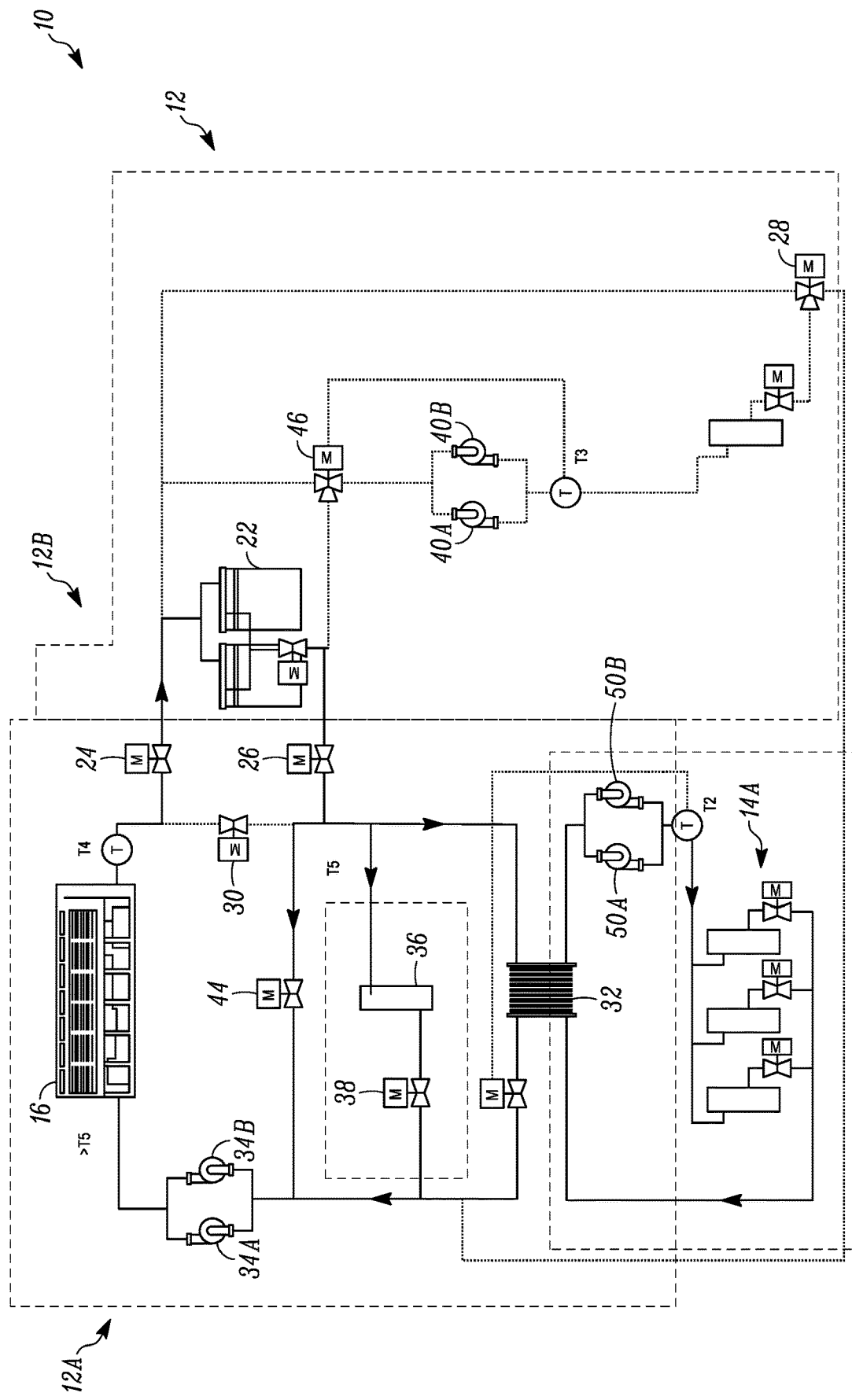

FIG. 2F represents an operating condition in which the chiller 16 can be used to make ice for the ice storage tanks 22, provide sensible cooling via the terminals 14A, and dehumidification via the heat exchanger 36. The operating mode shown in FIG. 2F can also be referred to as a nighttime operating mode.

The illustrated embodiment is similar to the embodiments described in FIGS. 2D and 2E. The embodiment of FIG. 2F can be a combination of the embodiments described in FIGS. 2D and 2E. In the embodiment of FIG. 2F, the process fluid can be provided from the chiller 16 at the temperature T4. The process fluid leaves the ice storage tanks 22 and can be provided to the chiller circuit 12A at the temperature T5. The process fluid can then be used to transfer heat via the heat exchangers 32 and 36. Similar to the embodiment in FIG. 2E, the optional heat exchanger 36 is included for the embodiment in FIG. 2F. Because of the heat exchange via the heat exchanger 32, the process fluid in the terminal cooling circuit 18 can be provided at the temperature T2 to the terminals 14A. The process fluid in the chiller circuit 12A can be returned to the chiller 16 at a temperature that is greater than the temperature T5.

Figure 3:
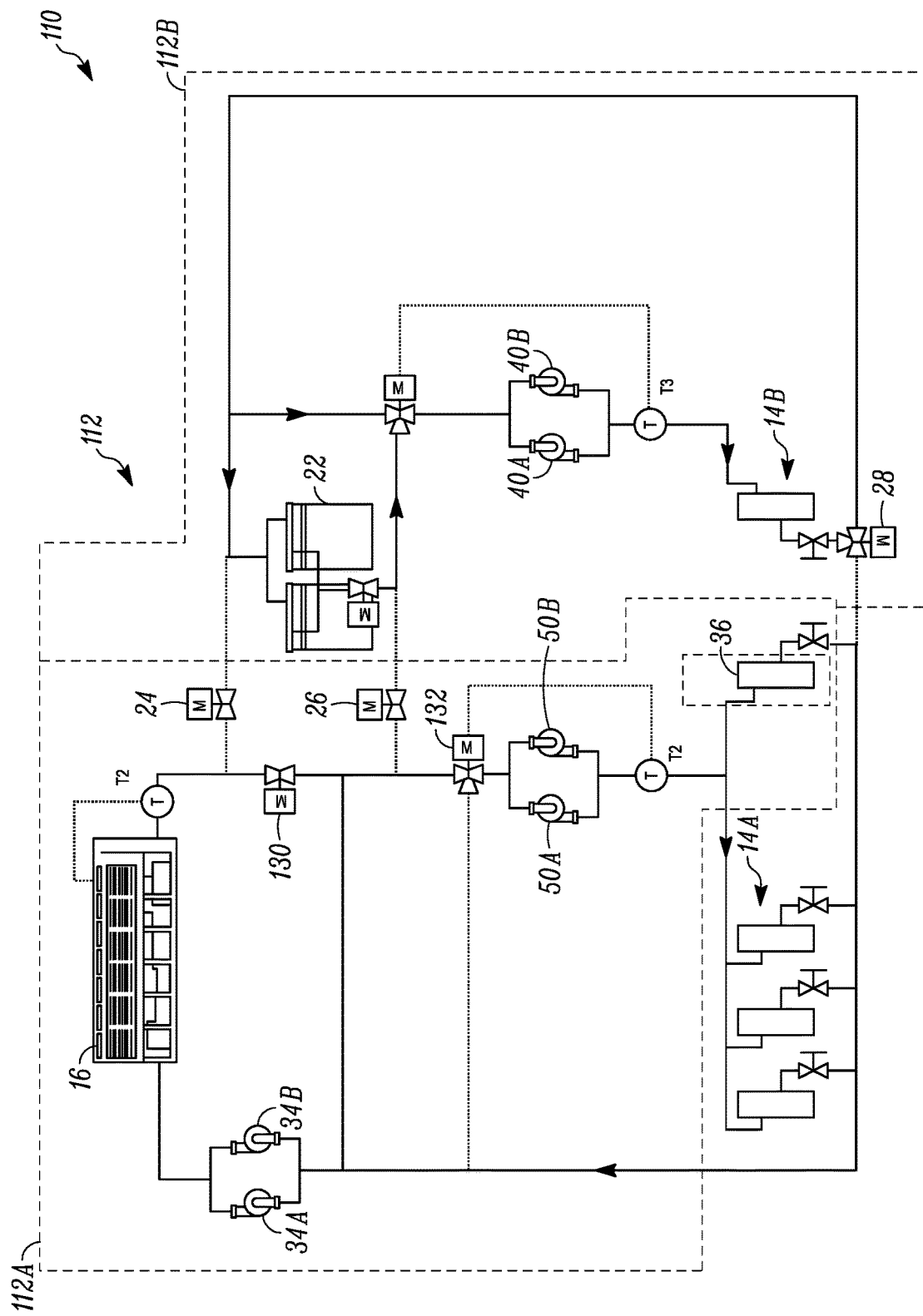
FIG. 3 is a schematic diagram of an HVACR system that includes a chiller plant and other components of the HVACR system, according to an embodiment.

FIG. 3 is a schematic diagram of an HVACR system 110 that includes a chiller plant 112 and other components of the HVACR system 110, according to an embodiment. Aspects of FIG. 3 can be the same as or similar to aspects of FIG. 1. The other components of the HVACR system 110 can include, for example, various terminal devices/systems including, but not limited to, a sensible cooling variable air volume (VAV) terminal 14A and/or an air handling unit (AHU) 14B.

In the illustrated embodiment, three terminals 14A are shown. It will be appreciated that the number of terminals 14A is illustrative and can vary based on, for example, a building in which the HVACR system 110 is implemented.

In an embodiment, the chiller plant 112 includes a chiller 16. The chiller 16 can be configured to provide a process fluid (e.g., a mixture of water and glycol, etc.) at the temperature T2. The temperature T2 can vary according to an operating mode of the chiller 16. An operating mode can include a configuration selected to control the chiller 16 and its outputs to accomplish a particular environmental control goal (e.g., sensible cooling or dehumidification) or to make ice for the ice storage tanks 22. For example, the operating mode can be selected to provide sensible cooling and/or dehumidification to the building. FIGS. 4A-4F, described in further detail below, show configurations of the HVACR system 10 according to various operating modes.

The chiller plant 112 includes a chiller circuit 112A and an air handling circuit 112B. In contrast to the embodiment in FIG. 1, the HVACR system 110 does not include the terminal cooling circuit 18. The chiller circuit 112A includes a process fluid circuit that generally includes a system or fluid circuit that may include, as appropriate, pipes, lines, pumps, valves, etc., that are configured to direct a process fluid conditioned by the chiller 16 to the terminals 14A. The air handling circuit 112B includes a process fluid circuit that generally includes a system or fluid circuit that may include, as appropriate, pipes, lines, pumps, valves, etc., that are configured to direct a process fluid to the AHU 14B.

The chiller circuit 112A generally includes the chiller 16; flow control devices 130, 132; a plurality of pumps 50A, 50B; a heat exchanger 36; terminals 14A; and a plurality of pumps 34A, 34B, fluidly connected. The pumps 34A, 34B and the pumps 50A, 50B can be used to circulate the process fluid throughout the chiller circuit 12A. The chiller 16 is not intended to be limited to a particular chiller design. For example, the chiller 16 can be an air-cooled chiller, a water-cooled chiller, or the like. The chiller 16 includes a refrigerant circuit (not shown) that can be configured to output the process fluid (e.g., water and glycol) at the temperature T2. The heat exchanger 36 is illustrated within dashed lines because the heat exchanger 36 is optional. The heat exchanger 36 can be used for cooling (and in an embodiment, dehumidification as well) and can be the same as or similar to a heat exchanger of the AHU 14B. In an embodiment, including the heat exchanger 36 can reduce a cooling load on the heat exchanger of the AHU 14B. Reducing the cooling load on the heat exchanger of the AHU 14B can, in an embodiment, reduce a size and/or number of the ice storage tanks 22 included in the HVACR system 110. In an embodiment, including the heat exchanger 36 can provide an increase in efficiency of the HVACR system 110 over an HVACR system 110 that does not include the heat exchanger 36.

The chiller circuit 112A and the air handling circuit 112B are fluidly connectable. In the illustrated embodiment, the chiller circuit 112A and the air handling circuit 112B are fluidly separated by, for example, preventing flow of the process fluid between the circuits 112A, 112B. The flow can be controlled using flow control devices 24, 26, and 28. The flow control devices 24, 26, and 28 can be, for example, valves. In an embodiment, the flow control devices 24 and 26 can be two-way valves having a flow enabled state and a flow disabled state. The flow control device 28 can be a three-way flow control device that includes a flow enabled state and a flow disabled state for the three connections. In the illustrated embodiment, the flow control devices 24 and 26 are in the flow disabled state and the flow control device 28 is in a flow enabled state within the air handling circuit 112B and a flow disabled state for a connection between the air handling circuit 112B and a location that is downstream of the heat exchanger 36 in the chiller circuit 112A. In these states, the chiller circuit 112A and the air handling circuit 112B are fluidly separated.

In the illustrated embodiment, the terminals 14A can be provided with the same process fluid as is used by the chiller 16. For example, the chiller 16 and the terminals 14A can both use a process fluid that includes a mixture of water and glycol.

The air handling circuit 112B includes ice storage tanks 22 fluidly connected with the AHU 14B and a plurality of pumps 40A, 40B. The plurality of pumps 40A, 40B can be used for circulating the process fluid throughout the air handling circuit 112B. In the illustrated embodiment, two ice storage tanks 22 are shown. It will be appreciated that the number of ice storage tanks 22 can vary. That is, in an embodiment, there can be a single ice storage tank 22. In an embodiment, there can be more than two ice storage tanks 22. For example, the number of ice storage tanks 22 can be based on cooling requirements of the building for which the HVACR system 110 is being used. The air handling circuit 112B generally includes a same process fluid as the process fluid used by the chiller 16. That is, if the chiller 16 includes a process fluid that is a combination of water and glycol, then the air handling circuit 112B includes a process fluid that is a combination of water and glycol.

In the illustrated embodiment, the chiller 16 can generally provide the process fluid at the temperature T2. The air handling circuit 112B can use melting of the ice in the ice storage tanks 22 to provide the process fluid at a temperature T3 to the AHU 14B. The operating mode shown in FIG. 3 may be representative of an operating mode in which the building of the HVACR system 110 is occupied. In an embodiment, the occupied operating condition may be generally referred to as a daytime operating mode.

FIGS. 4A-4F are schematic diagrams showing configurations for the HVACR system 110 shown in FIG. 3 in various operating modes.

Figure 4A:
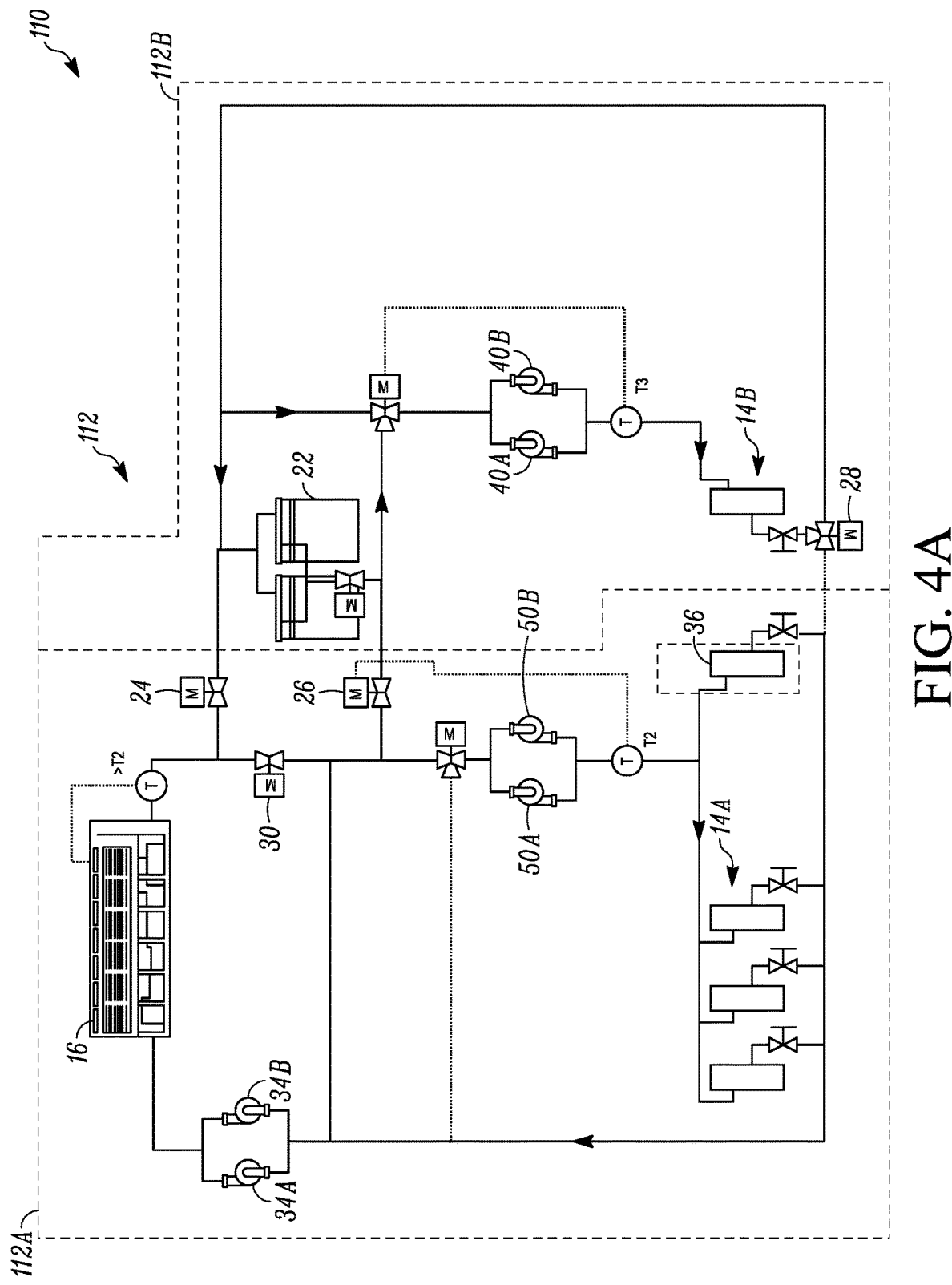
FIGS. 4A-4F are schematic diagrams showing configurations for the HVACR system shown in FIG. 3 in various operating modes.

FIG. 4A represents an operating condition in which the ice from the ice storage tanks 22 may be used to provide sensible cooling via the terminals 14A and dehumidification via the AHU 14B, according to an embodiment. The operating mode shown in FIG. 4A may be an alternative daytime operating mode relative to FIG. 3. The operating mode in FIG. 4A may be generally operational when the building of the HVACR system 110 is occupied.

In the illustrated embodiment, the process fluid provided from the chiller 16 may be provided at a temperature that is greater than the temperature T2. In an embodiment, operating the chiller 16 to provide the relatively warmer process fluid may, for example, reduce an amount of energy consumed by the chiller 16. In the illustrated embodiment, the flow control devices 24 and 26 are in the flow enabled state. Accordingly, the chiller circuit 112A and the air handling circuit 112B are fluidly connected. Because of the fluid connection, ice that is melting from the ice storage tanks 22 and is at a temperature lower than T2 can be mixed with the process fluid from the chiller 16. As a result, the process fluid can leave the chiller 16 at a temperature that is greater than T2, but be cooled to the temperature T2 at a location that is upstream of the terminals 14A. As a result, the process fluid provided to the terminals 14A can be provided at the temperature T2, even when the chiller 16 is outputting the process fluid at a temperature that is greater than the temperature T2. In the illustrated embodiment, the ice is melting from the ice storage tanks 22 and can be used to provide the process fluid of the outdoor air handling circuit 112B to the AHU 14B at the temperature T3.

Figure 4B:
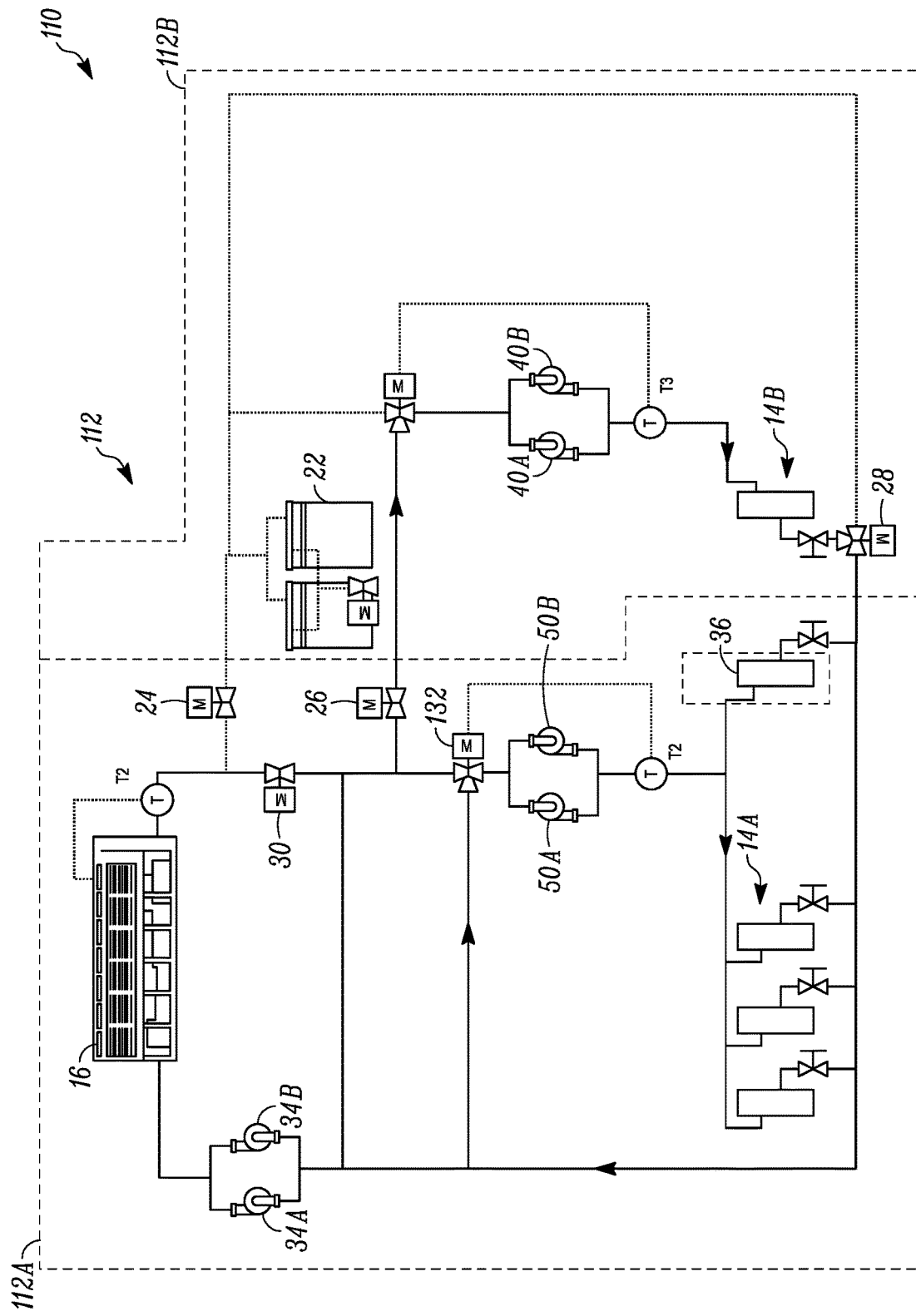

FIG. 4B represents an operating condition in which the chiller 16 can be used for both sensible cooling via the terminals 14A and dehumidification via the AHU 14B, according to an embodiment. The operating mode shown in FIG. 4B may be an alternative daytime operating mode relative to FIGS. 3 and 4A. The operating mode in FIG. 4B may be generally operational when the building of the HVACR system 110 is occupied.

In the illustrated embodiment, the process fluid provided from the chiller 16 may be provided at the temperature T3. In the illustrated embodiment, the flow control device 24 can be in the flow disabled state. The flow control device 26 can be in the flow enabled state. The flow control device 28 can be in a state in which flow is disabled between the chiller 16 and the flow control device 28. The flow control device 28 can be in a state in which flow is enabled between the AHU 14B and the flow control device 28. The flow control device 28 can be in the flow enabled state between the flow control device 28 and a location of the chiller circuit 112A that is downstream of the heat exchanger 36. The state of the flow control devices 24, 26, and 28, enables fluid communication between the chiller circuit 112A and the air handling circuit 112B. However, the ice storage tanks 22 are fluidly separated from the air handling circuit 112B by placing a flow control device 42 in a flow disabled state. In such an embodiment, the ice storage tanks 22 may, for example, be empty or have an insufficient amount of ice to provide the process fluid at the temperature T3. The chiller 16 can provide the process fluid at the temperature T3. In the illustrated embodiment, the process fluid can be provided to the AHU 14B at the temperature T3. A flow control device 132 can enable some mixing of the process fluid at the temperature T3 can with warmer process fluid via the pumps 50A, 50B so that the process fluid is provided to the terminals 14A at the temperature T2. The diverted state of the flow control device 28 returns the process fluid to a location that is downstream of the heat exchanger 36.

Figure 4C:
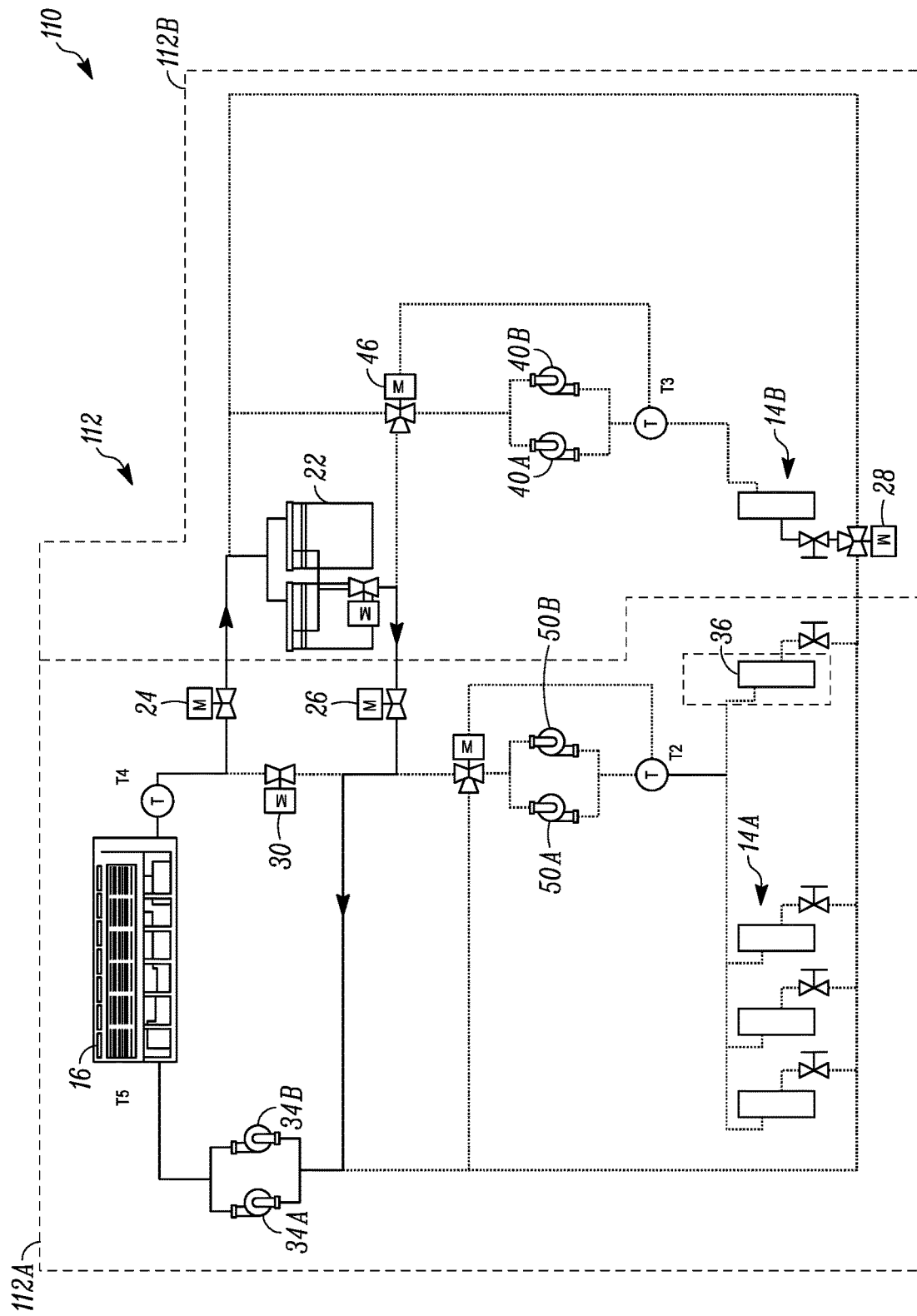

FIG. 4C represents an operating condition in which the chiller 16 can be used to make ice for the ice storage tanks 22, according to an embodiment. The operating mode shown in FIG. 2C may be an operating mode that is enabled, for example, when the building of the HVACR system 110 is unoccupied. Accordingly, the operating mode in FIG. 4C may alternatively be referred to as the nighttime operating mode in an embodiment.

In the illustrated embodiment, the process fluid can be provided from the chiller 16 at the temperature T4. In the illustrated embodiment, the flow control device 24 and the flow control device 26 may be in the flow enabled state. A flow control device 30 may be in a flow disabled state to prevent the process fluid from bypassing the ice storage tanks 22. A flow control device 46 can be in a flow disabled state so that the process fluid is not provided to the AHU 14B. In an embodiment, the process fluid returned to the chiller 16 can be at a temperature T5.

Figure 4D:
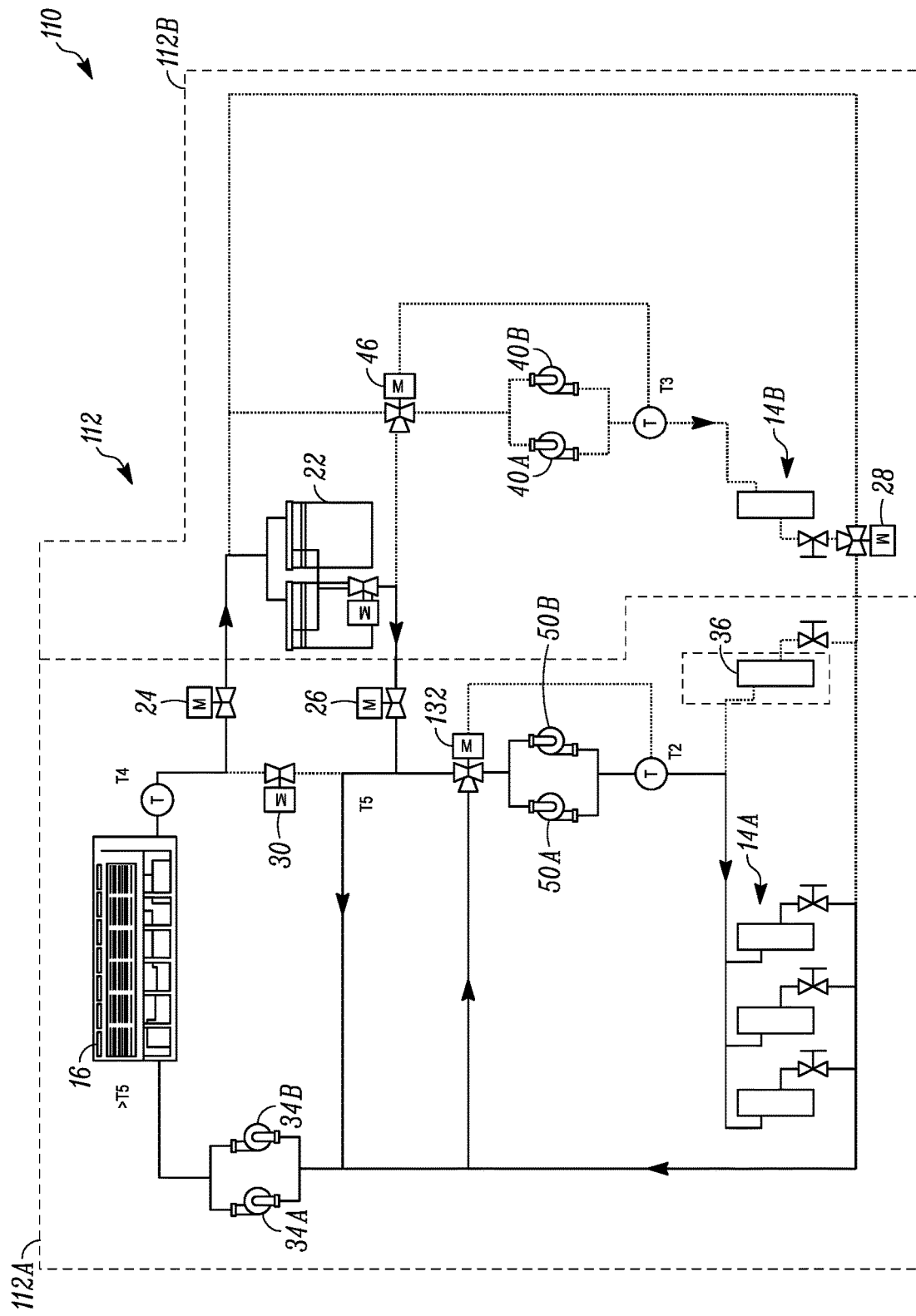

FIG. 4D represents an operating condition in which the chiller 16 can be used to make ice for the ice storage tanks 22 and to provide sensible cooling via the terminals 14A, according to an embodiment. The operating mode shown in FIG. 4D may generally be an operating mode in which ice can be made for later use (similar to FIG. 4C), as well as cooling provided to the terminals 14A. Such an operating mode may be used when, for example, the building is unoccupied but there is a cooling demand. The operating mode in FIG. 4D can be referred to as a nighttime operating mode.

The illustrated embodiment is similar to the embodiment shown and described relative to FIG. 4C. In FIG. 4D, the process fluid flow is enabled to the terminals 14A. In FIG. 4D, the process fluid can be provided from the chiller 16 at the temperature T4. The process fluid leaving the ice storage tanks 22 is at the temperature T5. Flow control device 132 can enable mixing of some of this fluid at temperature T5 with fluid returning from the terminals 14A so that the resulting mixed fluid being provided to the terminals 14A can be at the temperature T2. The process fluid can be returned to the chiller 16 at a temperature that is greater than the temperature T5.

Figure 4E:
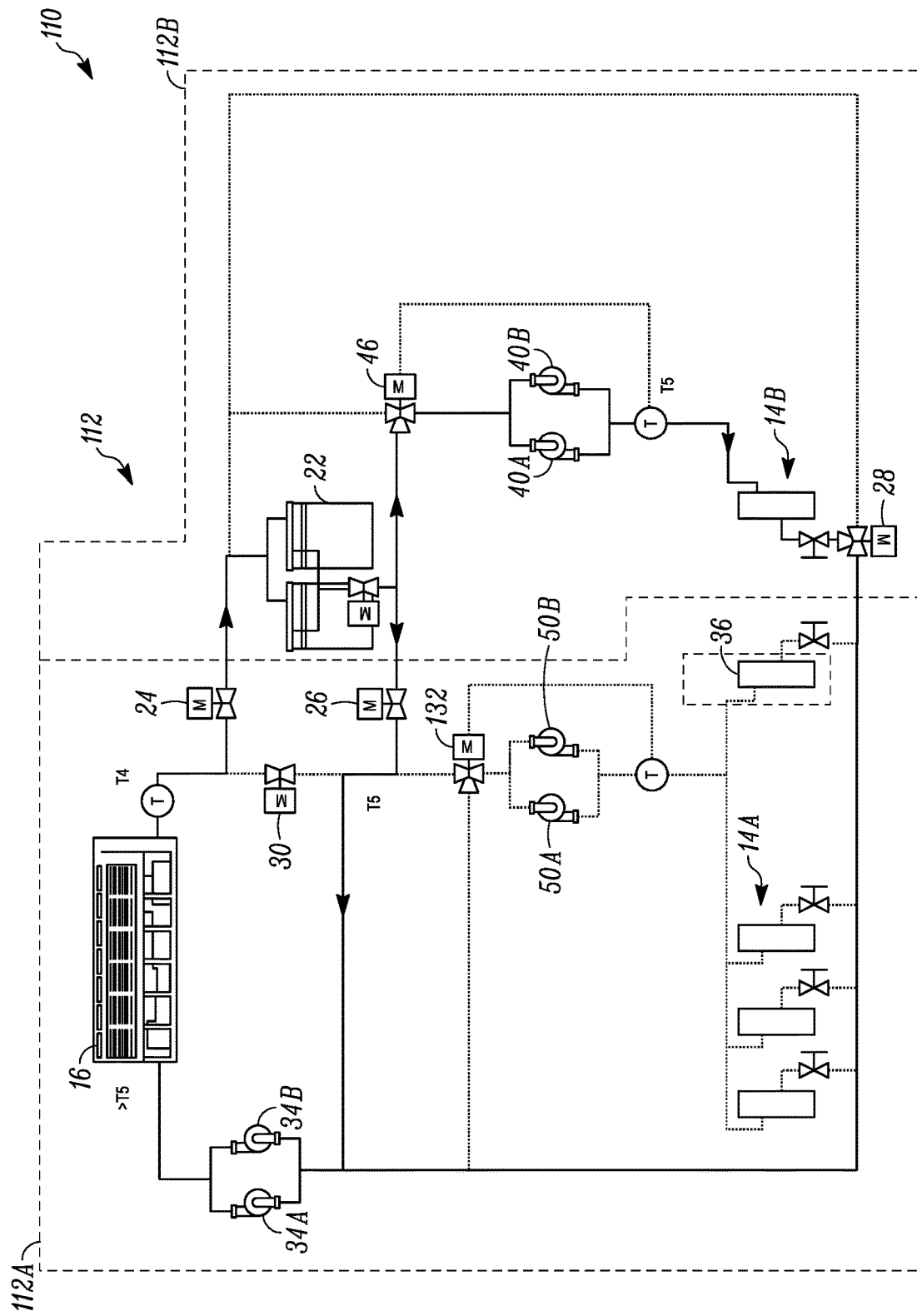

FIG. 4E represents an operating condition in which the chiller 16 can be used to make ice for the ice storage tanks 22 and for dehumidification using the AHU 14B, according to an embodiment. The operating mode shown in FIG. 4E may generally be an operating mode in which ice can be made for later use, as well as dehumidification provided via the AHU 14B. Such an operating mode may be used when, for example, the building of the HVACR system 110 is unoccupied but there is a need to reduce humidity. The operating mode in FIG. 4E can also be referred to as a nighttime operating mode.

The illustrated embodiment is similar to the embodiment shown and described relative to FIG. 4C. The process fluid leaving the ice storage tanks 22 can be at the temperature T5. The process fluid can then be provided to the AHU 14B, and can be returned to the chiller 16 at a temperature that is greater than the temperature T5.

Figure 4F:
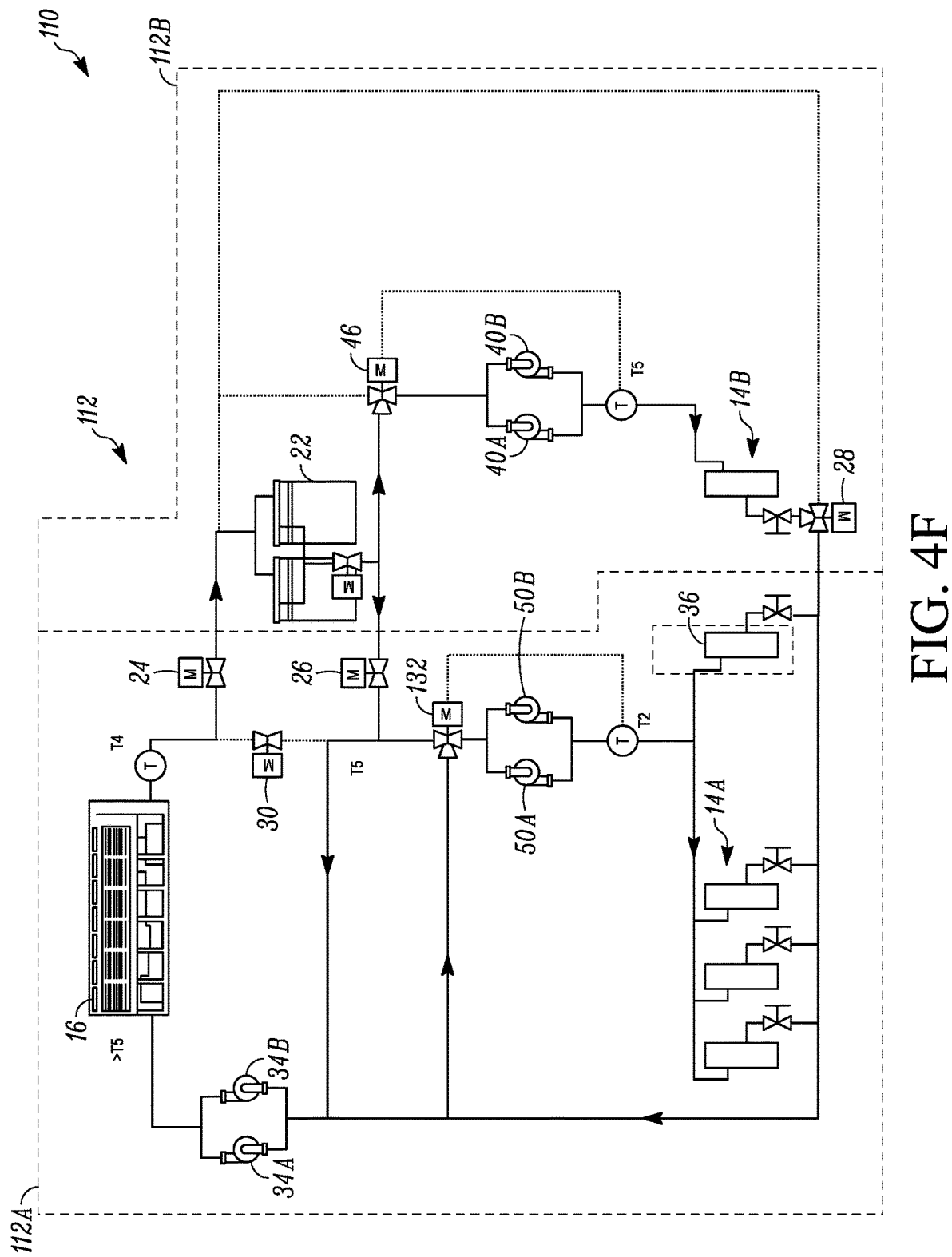

FIG. 4F represents an operating condition in which the chiller 16 can be used to make ice for the ice storage tanks 22, provide sensible cooling via the terminals 14A, and dehumidification via the AHU 14B. The operating mode shown in FIG. 4F can also be referred to as a nighttime operating mode.

The illustrated embodiment is similar to the embodiments described in FIGS. 4D and 4E. The embodiment of FIG. 4F can be a combination of the embodiments described in FIGS. 4D and 4E. In the embodiment of FIG. 4F, the process fluid can be provided from the chiller 16 at the temperature T4. The process fluid leaves the ice storage tanks 22 and can be provided to the chiller circuit 12A at the temperature T5. The process fluid can then be used to provide sensible cooling via the terminals 14A and dehumidification via the AHU 14B. The process fluid in the chiller circuit 12A can be returned to the chiller 16 at a temperature that is greater than the temperature T5.

Figure 5A:
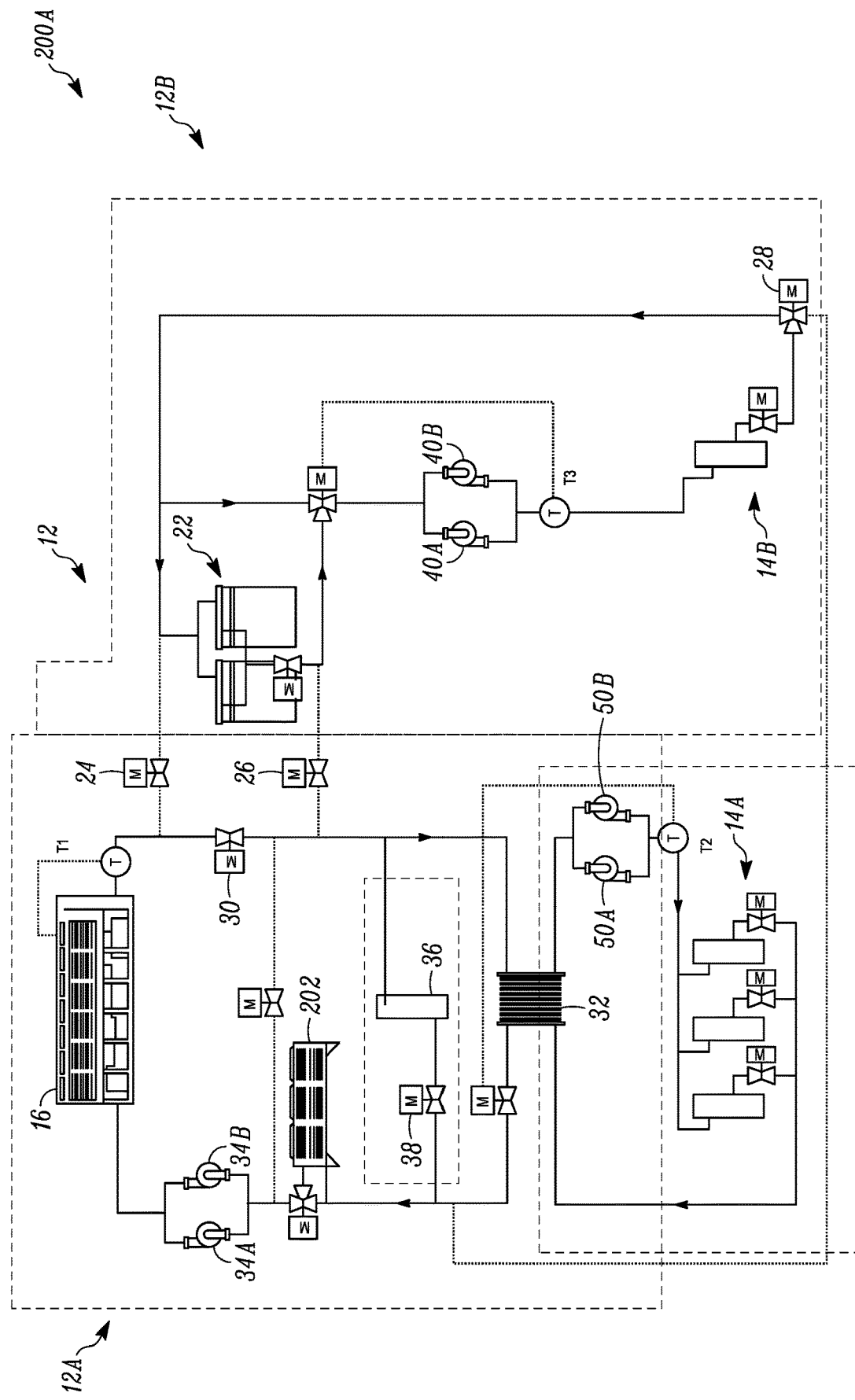
FIGS. 5A-5B are schematic diagrams of HVACR systems that include a chiller plant having free cooling and other components of the HVACR system, according to an embodiment.
Figure 5B:
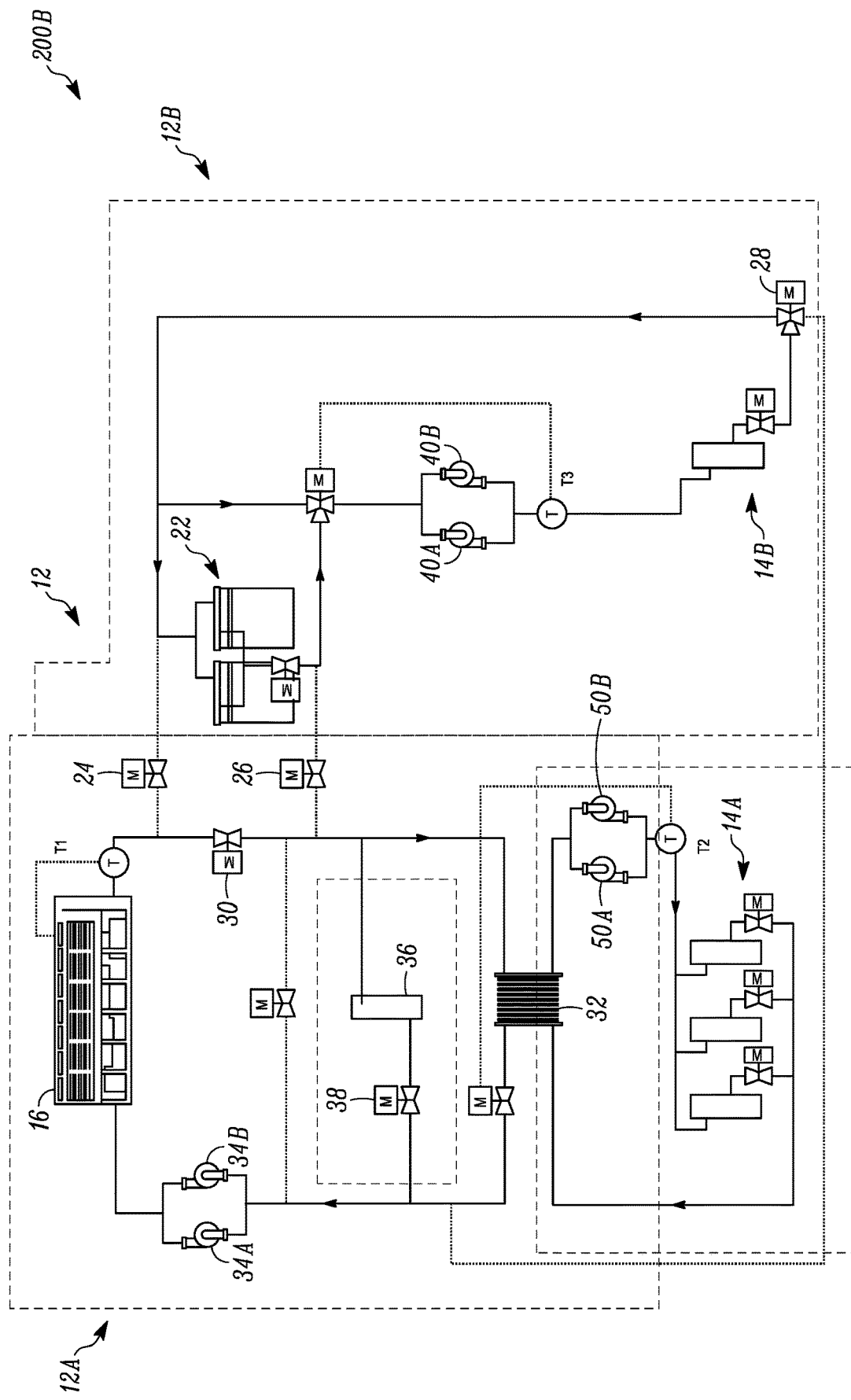

FIGS. 5A-5B are schematic diagrams of HVACR systems 200A, 200B including a free cooling option. In FIG. 5A, the free cooling option includes a separate dry cooler 202 that is separate from the chiller 16. In FIG. 5B, the free cooling option is incorporated into the chiller 16. The embodiment in FIG. 5B may generally be the same as the embodiment in FIG. 1. The embodiment in FIG. 5A is modified to include the dry cooler 202. It will be appreciated that the embodiment in FIG. 3 can similarly include a free cooling option.

Figure 6:
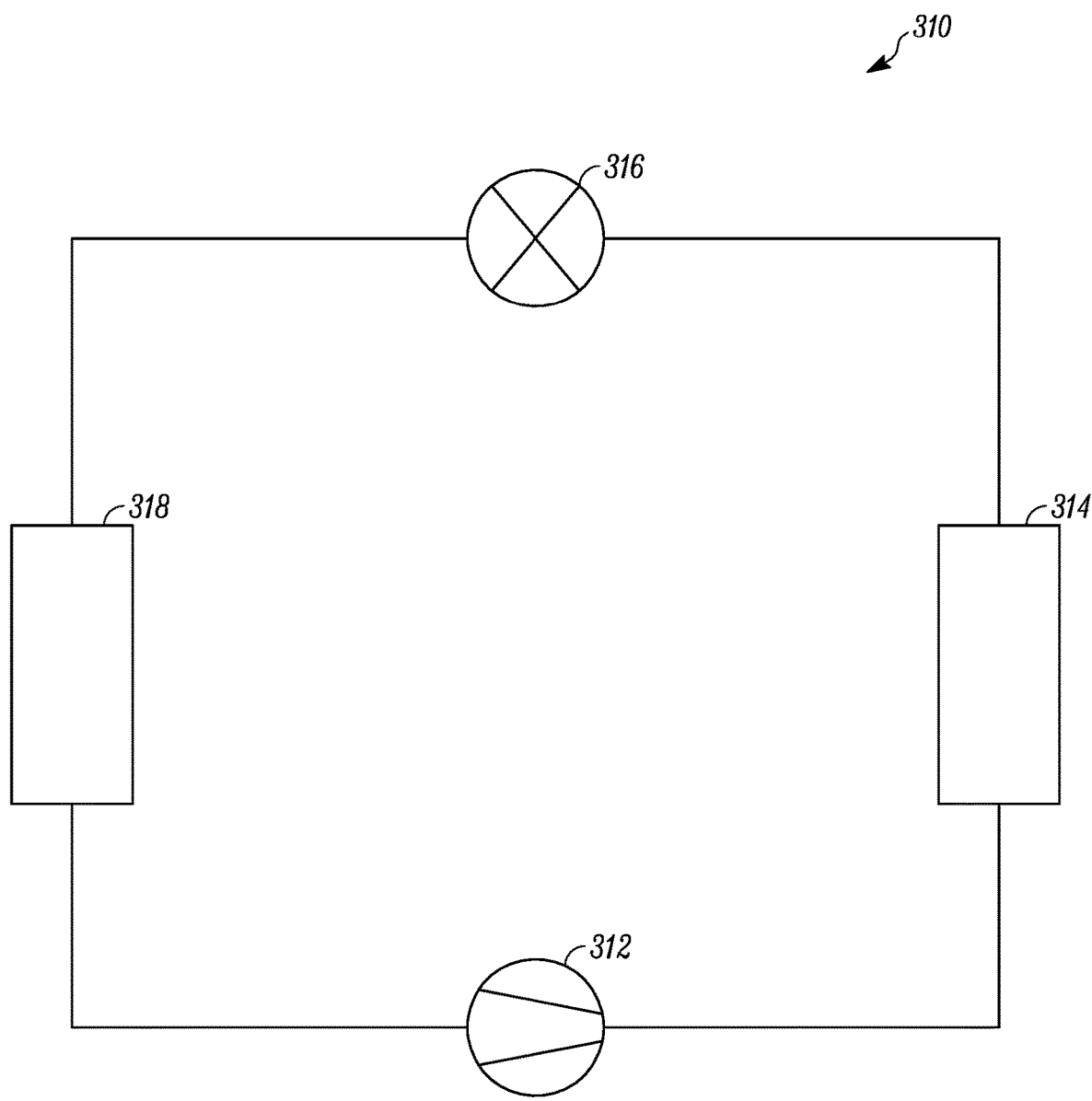
FIG. 6 is a schematic diagram of a refrigerant circuit, according to an embodiment.

FIG. 6 is a schematic diagram of a refrigerant circuit 310, according to an embodiment. The refrigerant circuit 310 generally includes a compressor 312, a condenser 314, an expansion device 316, and an evaporator 318. The compressor 312 can be, for example, a scroll compressor, a screw compressor, a centrifugal compressor, or the like. The refrigerant circuit 310 is an example and can be modified to include additional components. For example, in an embodiment, the refrigerant circuit 310 can include other components such as, but not limited to, an economizer heat exchanger, one or more flow control devices, a receiver tank, a dryer, a suction-liquid heat exchanger, or the like.

The refrigerant circuit 310 can generally be applied in a variety of systems used to control an environmental condition (e.g., temperature, humidity, air quality, or the like) in a space (generally referred to as a conditioned space). Examples of such systems include, but are not limited to, HVACR systems or the like.

The compressor 312, condenser 314, expansion device 316, and evaporator 318 are fluidly connected.

The refrigerant circuit 310 can operate according to generally known principles. The refrigerant circuit 310 can be configured to heat or cool a liquid process fluid (e.g., a heat transfer fluid or medium such as, but not limited to, water, glycol, combinations thereof, or the like), in which case the refrigerant circuit 310 may be generally representative of a liquid chiller system. For example, the refrigerant circuit 310 may be implemented in the chiller 16 shown and described above in accordance with FIGS. 1-5B above. Furthermore, the refrigerant circuit 310 and corresponding chiller (e.g., chiller 16) can be connected in parallel to condition the process fluid.

In operation, the compressor 312 compresses a working fluid (e.g., a heat transfer fluid such as a refrigerant or the like) from a relatively lower pressure gas to a relatively higher-pressure gas. The relatively higher-pressure gas is also at a relatively higher temperature, which is discharged from the compressor 312 and flows through the condenser 314. The working fluid flows through the condenser 310 and rejects heat to a process fluid (e.g., water, glycol, combinations thereof, or the like), thereby cooling the working fluid. The cooled working fluid, which is now in a liquid form, flows to the expansion device 316. The expansion device 316 reduces the pressure of the working fluid. As a result, a portion of the working fluid is converted to a gaseous form. The working fluid, which is now in a mixed liquid and gaseous form flows to the evaporator 318. The working fluid flows through the evaporator 318 and absorbs heat from a process fluid (e.g., water, glycol, combinations thereof, or the like), heating the working fluid, and converting it to a gaseous form. The gaseous working fluid then returns to the compressor 312. The above-described process continues while the refrigerant circuit is operating, for example, in a cooling mode (e.g., while the compressor 312 is enabled).

Figure 7:
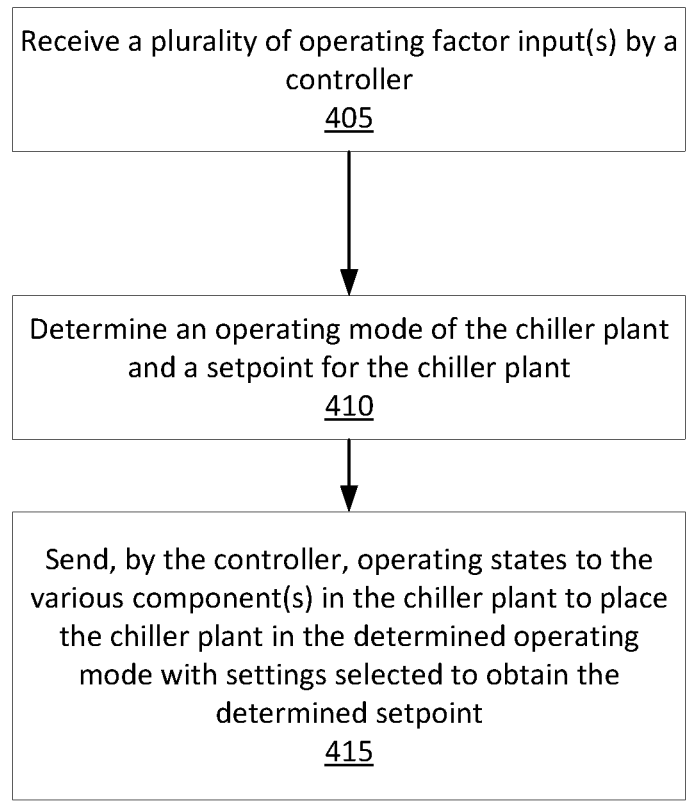
FIG. 7 is a schematic diagram of a method for controlling the HVACR systems of FIGS. 1-5B, according to an embodiment.

FIG. 7 is a schematic diagram of a method 400 for controlling a chiller plant (e.g., the HVACR systems 10, 110, and 200A/200B of FIGS. 1-5B), according to an embodiment. The method 400 is generally representative of a control method that includes receiving information indicative of operating conditions in a building having the chiller plant, making an operating mode determination, and controlling the various components of the chiller plant to achieve the desired operating conditions.

At 405, a plurality of operating factor inputs are received by a controller. The controller can include a processor, a memory, a clock, and an input/output (I/O) interface. In an embodiment, the controller can include fewer or additional components. The controller can receive the operating factor inputs from a plurality of sensors. The operating factor inputs can include, for example, a time of day schedule, a cold water load, a cool water load, a chiller failure status, an ice inventory status, or the like. It will be appreciated that additional inputs may be received at 405.

At 410, the controller utilizes the plurality of operating factor inputs to determine an operating mode of the chiller plant and a setpoint for the chiller plant. The controller may make separate decisions for the operating mode and the setpoint. For example, the operating mode determination may be made prior to making the setpoint determination, and the operating mode determination may be an input to the setpoint determination.

The various operating modes can include, for example, an "Off" mode; a mode in which the chiller circuit (e.g., chiller circuit 12A) and the air handling ciruit (e.g., the air handling circuit 12B) operate separately (e.g., FIG. 1); a mode in which the chiller circuit (e.g., chiller circuit 12A) and the air handling ciruit (e.g., the air handling circuit 12B) operate together (e.g., FIG. 2A); a mode in which the chiller circuit (e.g., chiller circuit 12A) is operating and the air handling circuit (e.g., air handling circuit 12B) is not operating (e.g., FIG. 2B); a mode in which the air handling circuit (e.g., the air handling circuit 12B) is operating but the chiller is not operating (e.g., FIG. 2D when the chiller is not operating); a mode in which ice is being made (e.g., FIG. 2C); a mode in which ice is being made and sensible cooling is enabled (e.g., FIG. 2D when the chiller is operating); a mode in which ice is being made and dehumidification is being performed (e.g., FIG. 2E); and a mode in which ice is being made, sensible cooling is enabled, and dehumidification is being performed (e.g., FIG. 2F). Each of the operating modes correspond to particular settings for the components of the chiller plant. The setpoint determination corresponds to an ice plant setpoint, a chiller setpoint, valve controls, pump speeds, and a chiller demand limit setpoint.

At 415, the controller communicates with the various components in the chiller plant to place the chiller plant in the corresponding mode with settings selected for the particular setpoint. For example, in the operating mode of FIG. 1 (e.g., chiller circuit 12A and air handling circuit 12B operating separately), the settings can include disabling flow through flow control device 44, enabling flow through flow control device 30, disabling flow through flow control device 24, etc.

Examples of operating modes for a chiller plant and corresponding settings that may be implemented using the above systems and the method 400 can include those identified in the following Tables 1A and 1B. It will be appreciated that the operating modes in Tables 1A and 1B can vary. For example, a chiller plant may not include all operating modes of Tables 1A and 1B. In an embodiment, a chiller plant may include more operating modes than included in Tables 1A and 1B. It will be appreciated that certain operating specifics (e.g., temperature set points, etc.) in the following tables may vary according to the implementation.

TABLE 1A

Example Operating Modes for a Chiller Plant

| Mode | Off | Chiller and Ice Separate | Chiller and Ice Combined | Chiller Only | Ice Only |
|---|---|---|---|---|---|
| | Disable chiller 16 | Enable chiller 16 Cooling Water set point - 55° F. Demand limit - 50% | Enable chiller 16 Cooling Water set point - 55° F. Demand limit - 50% | Enable chiller 16 Cooling Water set point - 40° F. Demand limit - 100% | Disable chiller 16 |
| | Disable pumps 34A, 34B Enable flow control device 13 | Modulate pumps 34A, 34B Modulate flow control device 13 to maintain chiller minimum flow | Modulate pumps 34A, 34B Modulate flow control device 13 to maintain chiller minimum flow | Modulate pumps 34A, 34B Modulate flow control device 13 to maintain chiller minimum flow | Modulate pumps 34A, 34B Disable flow control device 13 |
| | Disable flow through flow control device 44 | Disable flow through flow control device 44 | Disable flow through flow control device 44 | Disable flow through flow control device 44 | Disable flow through flow control device 44 |
| | Enable flow through flow control device 30 | Enable flow through flow control device 30 | Modulate flow control device 30 to maintain set point at 55° F. | Enable flow through flow control device 30 | Modulate flow control device 30 to maintain set point at 40° F. |
| | Enable flow through heat exchanger 32 | Modulate flow through heat exchanger 32 to control at 57° F. | Modulate flow through heat exchanger 32 to control at 57° F. | Modulate flow through heat exchanger 32 to control at 57° F. | Modulate flow through heat exchanger 32 to control at 57° F. |
| | Disable pumps 50A, 50B Disable flow control device 24 (bypass ice storage tanks 22) | Modulate pumps 50A, 50B Disable flow control device 24 (bypass ice storage tanks 22) | Modulate pumps 50A, 50B Enable flow control device 24 | Modulate pumps 50A, 50B Disable flow control device 24 (bypass ice storage tanks 22) | Modulate pumps 50A, 50B Enable flow control device 24 |
| | Enable flow control device 42 | Enable flow control device 42 | Enable flow control device 42 | Disable flow control device 42 | Enable flow control device 42 |
| | Enable flow control device 46 (flow from ice storage tanks 22) | Modulate flow control device 46 (maintain supply water at 40° F.) | Modulate flow control device 46 (maintain supply water at 40° F.) | Enable flow control device 46 (flow from chiller 16) | Disable flow control device 46 (flow bypassing ice storage tanks 22) |
| | Disable pumps | Modulate pumps 40A, | Modulate pumps 40A, | Modulate pumps | Disable pumps |

TABLE 1A-continued

Example Operating Modes for a Chiller Plant

| Mode | Off | Chiller and Ice Separate | Chiller and Ice Combined | Chiller Only | Ice Only |
|---|---|---|---|---|---|
| | 40A, 40B 100% return to ice storage tanks 22 | 40B 100% return to ice storage tanks 22 | 40B 100% return to ice storage tanks 22 | 40A, 40B 100% return to chiller 16 | 40A, 40B 100% return to ice storage tanks 22 |

TABLE 1B

Example Operating Modes for a Chiller Plant

| Mode | Ice Only | Make Ice | Make Ice and Sensible Cooling | Make Ice and De-humidification | Make Ice, Sensible Cooling and De-humidification |
|---|---|---|---|---|---|
| | Disable chiller 16 | Enable chiller 16 - Ice Making Demand limit - 100% | Enable chiller 16 - Ice Making Demand limit - 100% | Enable chiller 16 - Ice Making Demand limit - 100% | Enable chiller 16 - Ice Making Demand limit - 100% |
| | Modulate pumps 34A, 34B | Enable pumps 34A, 34B at full speed | Enable pumps 34A, 34B at full speed | Enable pumps 34A, 34B at full speed | Enable pumps 34A, 34B at full speed |
| | Disable flow control device 13 | Modulate flow control device 13 to maintain chiller minimum flow | Modulate flow control device 13 to maintain chiller minimum flow | Modulate flow control device 13 to maintain chiller minimum flow | Modulate flow control device 13 to maintain chiller minimum flow |
| | Disable flow through flow control device 44 | Enable flow through flow control device 44 | Enable flow through flow control device 44 - modulating closed if flow through heat exchanger 32 is enabled at 100% for 5 minutes | Enable flow through flow control device 44 - modulating closed if flow control device 38 is enabled at 100% for 5 minutes | Enable flow through flow control device 44 - modulating closed if flow control device 38 or flow through heat exchanger 32 is enabled at 100% for 5 minutes |
| | Modulate flow control device 30 | Disable flow control device 30 | Disable flow control device 30 | Disable flow control device 30 | Disable flow control device 30 |
| | Modulate flow through heat exchanger 32 | Disable flow through heat exchanger 32 | Modulate flow through heat exchanger 32 | Disable flow through heat exchanger 32 | Modulate flow through heat exchanger 32 |
| | Modulate pumps 50A, 50B Enable | Disable pumps 50A, 50B Enable | Modulate pumps 50A, 50B Enable | Disable pumps 50A, 50B Enable flow | Modulate pumps 50A, 50B Enable flow |
| | flow control device 24 | flow control device 24 | flow control device 24 | control device 24 | control device 24 |
| | Enable flow control device 42 | Enable flow control device 42 | Enable flow control device 42 | Enable flow control device 42 | Enable flow control device 42 |
| | Disable flow control device 46 (flow bypassing ice storage tanks 22) | Disable flow control device 46 (flow bypassing ice storage tanks 22) | Disable flow control device 46 (flow bypassing ice storage tanks 22) | Disable flow control device 46 (flow bypassing ice storage tanks 22) | Disable flow control device 46 (flow bypassing ice storage tanks 22) |
| | Disable pumps 40A, 40B 100% Return to ice storage tanks 22 | Disable pumps 40A, 40B 100% Return to ice storage tanks 22 | Disable pumps 40A, 40B 100% Return to ice storage tanks 22 | Disable pumps 40A, 40B 100% Return to ice storage tanks 22 | Disable pumps 40A, 40B 100% Return to ice storage tanks 22 |

Aspects:

It is to be appreciated that any one of aspects 1-6 can be combined with any one of aspects 7-10 and aspects 11-13. Any one of aspects 7-10 can be combined with any one of aspects 11-13.

Aspect 1. A chiller plant, comprising:
a chiller circuit including a chiller, a first process fluid circuit, and a first heat exchanger, the chiller being configured to provide a first process fluid at a first temperature;
an air handling circuit including a plurality of ice storage tanks and an air handling unit; and
a terminal cooling circuit including a plurality of terminals, the terminal cooling circuit providing a second process fluid to the plurality of terminals at a second temperature that is different from the first temperature, the terminal cooling circuit being fluidly separate from, but thermally communicating with the chiller circuit via the first heat exchanger.

Aspect 2. The chiller plant according to aspect 1, wherein the first process fluid and the second process fluid are different.

Aspect 3. The chiller plant according to any one of aspects 1-2, wherein the ice storage tanks provide a third process fluid at a third temperature to the air handling unit.

Aspect 4. The chiller plant according to aspect 3, wherein the third process fluid is the same as the first process fluid, and the third temperature is less than the first temperature.

Aspect 5. The chiller plant according to any one of aspects 1-4, further comprising a plurality of connecting lines, wherein the connecting lines fluidly connect the chiller circuit and the air handling circuit.

Aspect 6. The chiller plant according to any one of aspects 1-5, wherein the chiller circuit further comprises a second heat exchanger disposed upstream of the first heat exchanger.

Aspect 7. A chiller plant, comprising:
a chiller circuit including a chiller and a process fluid circuit, the chiller being configured to provide a process fluid at a first temperature; and an air handling circuit including a plurality of ice storage tanks and an air handling unit.

Aspect 8. The chiller plant according to aspect 7, further comprising a heat exchanger disposed upstream of the plurality of terminals.

Aspect 9. The chiller plant according to any one of aspects 7-8, wherein the chiller circuit and the air handling circuit are operable separately, wherein the chiller provides the process fluid at the first temperature to a plurality of sensible cooling terminals, and ice in the plurality of ice storage tanks serves as a process fluid for the air handling unit.

Aspect 10. The chiller plant according to any one of aspects 7-9, wherein the chiller circuit and the air handling circuit are fluidly connectable such that the chiller is used to create ice for the plurality of ice storage tanks.

Aspect 11. A method of operating a chiller plant, the method comprising:

receiving, by a controller, a plurality of operating factor inputs from one or more sensors in a chiller plant;

determining, by the controller, an operating mode and a setpoint based on the plurality of operating factors; and sending, by the controller, operating states to one or more components of the chiller plant to place the chiller plant in the operating mode and at the setpoint as determined.

Aspect 12. The method according to aspect 11, wherein determining, by the controller, the operating mode and the setpoint based on the plurality of operating factors includes determining the operating mode first, and using the operating mode as an input to determining the setpoint.

Aspect 13. The method according to any one of aspects 11 or 12, wherein sending, by the controller, operating states includes sending one or more of an instruction to enable or disable a flow control device, enable or disable a pump, modify a pump speed, and enable or disable a chiller.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A chiller plant, comprising:
a chiller circuit including a chiller, a first process fluid circuit, and a first heat exchanger,
wherein the chiller is configured to provide a first process fluid at a first temperature, and
wherein the first heat exchanger is configured to cool and to dehumidify;
an air handling circuit including a plurality of ice storage tanks and an air handling unit,
wherein a cooling load of the air handling unit is reduced by the first heat exchanger; and
a terminal cooling circuit including a plurality of terminal heat exchangers, the terminal cooling circuit providing a second process fluid to the plurality of terminal heat exchangers at a second temperature that is different from the first temperature, the terminal cooling circuit being fluidly separate from, but thermally communicating with the chiller circuit via the first heat exchanger, wherein the terminal cooling circuit is in direct thermal communication with the first heat exchanger.

2. The chiller plant according to claim 1, wherein the first process fluid and the second process fluid are different.

3. The chiller plant according to claim 1, wherein the ice storage tanks provide a third process fluid at a third temperature to the air handling unit.

4. The chiller plant according to claim 3, wherein the third process fluid is the same as the first process fluid, and the third temperature is less than the first temperature.

5. The chiller plant according to claim 1, further comprising a plurality of connecting lines, wherein the connecting lines fluidly connect the chiller circuit and the air handling circuit.

6. The chiller plant according to claim 1, wherein the chiller circuit further comprises a second heat exchanger disposed upstream of the first heat exchanger.

7. The chiller plant according to claim 1, wherein the first process fluid and the second process fluid include at least one of water and glycol.

8. The chiller plant according to claim 7, wherein the first process fluid and the second process fluid are the same fluid.

9. A method of operating the chiller plant of claim 1, the method comprising:
receiving, by a controller, a plurality of operating factor inputs from one or more sensors in a chiller plant;
determining, by the controller, an operating mode and a setpoint based on the plurality of operating factors; and
sending, by the controller, operating states to one or more components of the chiller plant to place the chiller plant in the operating mode and at the setpoint as determined.

10. The method according to claim 9, wherein determining, by the controller, the operating mode and the setpoint based on the plurality of operating factors includes determining the operating mode first, and using the operating mode as an input to determining the setpoint.

11. The method according to claim 9, wherein sending, by the controller, operating states includes sending one or more of an instruction to enable or disable a flow control device, enable or disable a pump, modify a pump speed, and enable or disable a chiller.

12. A chiller plant, comprising:
a chiller circuit including a chiller and a process fluid circuit, the chiller being configured to provide a process fluid at a first temperature; and
an air handling circuit including a plurality of ice storage tanks and an air handling unit to handle the process fluid,
wherein the process fluid is provided from the chiller circuit to the air handling circuit;
wherein the chiller circuit and the air handling circuit are operable separately,
wherein the chiller provides the process fluid at the first temperature to a plurality of sensible cooling terminal heat exchangers, and ice in the plurality of ice storage tanks serves as a process fluid for the air handling unit.

13. The chiller plant according to claim 12, further comprising a heat exchanger disposed upstream of the plurality of sensible cooling terminal heat exchangers.

14. The chiller plant according to claim 12, wherein the chiller circuit and the air handling circuit are fluidly connectable such that the chiller is used to create ice for the plurality of ice storage tanks.

\* \* \* \* \*